(12) United States Patent
Kief et al.

(10) Patent No.: US 9,372,835 B2
(45) Date of Patent: Jun. 21, 2016

(54) SYSTEM AND METHOD FOR PRESENTATION CREATION

(75) Inventors: Christopher Kief, New York, NY (US); David Lee, New York, NY (US)

(73) Assignee: PILOT.IS LLC, New York, NY (US)

( * ) Notice: Subject to any disclaimer, the term of this patent is extended or adjusted under 35 U.S.C. 154(b) by 0 days.

(21) Appl. No.: 13/400,036

(22) Filed: Feb. 17, 2012

(65) Prior Publication Data
US 2012/0221449 A1 Aug. 30, 2012

Related U.S. Application Data

(63) Continuation-in-part of application No. 13/224,315, filed on Sep. 1, 2011.

(60) Provisional application No. 61/379,236, filed on Sep. 1, 2010, provisional application No. 61/379,037, filed on Sep. 1, 2010.

(51) Int. Cl.
*G06F 3/0481* (2013.01)
*G06F 17/22* (2006.01)
*G06F 17/30* (2006.01)

(52) U.S. Cl.
CPC ........ *G06F 17/2241* (2013.01); *G06F 17/3089* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,421,391 | B1 * | 9/2008 | Merkel | 704/270 |
| 7,743,331 | B1 * | 6/2010 | Fleischer et al. | 715/731 |
| 7,810,021 | B2 * | 10/2010 | Paxson | 715/205 |
| 2006/0129933 | A1 | 6/2006 | Land | |
| 2006/0256130 | A1 | 11/2006 | Gonzalez | |
| 2007/0074268 | A1 | 3/2007 | Pepper et al. | |
| 2007/0188520 | A1 * | 8/2007 | Finley et al. | 345/619 |
| 2007/0260695 | A1 | 11/2007 | Fenton | |
| 2008/0085096 | A1 | 4/2008 | Marshall | |
| 2010/0122171 | A1 | 5/2010 | Bauchot et al. | |
| 2011/0004563 | A1 | 1/2011 | Rauber et al. | |
| 2011/0071931 | A1 | 3/2011 | Negley | |
| 2011/0231518 | A1 * | 9/2011 | Srinivasan et al. | 709/219 |
| 2012/0323579 | A1 | 12/2012 | Gibbon et al. | |

* cited by examiner

*Primary Examiner* — Luna Champagne
(74) *Attorney, Agent, or Firm* — Kenyon & Kenyon LLP

(57) ABSTRACT

A system and method are provided for a network-based content management system (CMS) for creating and sharing presentation objects, and for generating revenue based on providing access to tools by which the presentation objects are created, stored and managed. In the system, a content management service includes a database that stores a presentation object, and a Web server stores a Web page including a link to the presentation object. When the Web page is displayed on a computing device that accesses the Web page via the Web, the presentation object appears as an embedded presentation.

20 Claims, 46 Drawing Sheets

Fig. 8

| LIGHTBOX ADMIN(logout) | Lightbox  Account  Password  Display Options  Manage Filters Lightbox Manager | New Slide |

Filter Categories

| Clients | Media | Date | Location | + Add a New Category |
|---|---|---|---|---|
| Aaaaa | Fffffff | 2010 | New York | |
| Bbbbbb | Gggggg | 2011 | Los Angeles | |
| CCCCC | Eeeeee | 2012 | France | |
| Dddddd | Hhhhhh | 2013 | Brazil | |
| Eeeeee | Iiiiiiiii | 2014 | New Guinea | |

Uncategorized Tags

Submit

| | Lightbox Manager | |
|---|---|---|
| LIGHTBOX ADMIN(logout) | Lightbox  Account  Password  Display Options  Manage Filters  Lightbox Manager | New Slide |

Lightbox Contents

| | |
|---|---|
| | Lightbox Name |
| | Slide Name |
| | Slide Name |
| | Lightbox Name |
| | Lightbox Name |
| | Slide Name |
| | Slide Name |
| | Slide Name |
| | Slide Name |
| | Slide Name |
| | Slide Name |
| | Slide Name |

Lightbox Manager

LIGHTBOX ADMIN(logout)   Lightbox  Account  Password  Display Options  Manage Filters  Lightbox Manager   New Slide Lightbox Contents

| | |
|---|---|
| | Lightbox Name |
| | Slide Name |
| | Slide Name |
| | Lightbox Name |
| | Lightbox Name |
| | Slide Name |
| | Slide Name |
| | Slide Name |
| | Slide Name |
| | Slide Name |
| | Slide Name |
| | Slide Name |

Edit    Delete
Tags: Aardvark, New York, 2012
Comment type: xxxx
Completed on: January 1, 2010
Publishing: OFF

SYSTEM AND METHOD FOR PRESENTATION CREATION

CROSS-REFERENCE TO RELATED APPLICATIONS

This application is a continuation-in-part application of U.S. patent application Ser. No. 13/224,315, filed Sep. 1, 2011, which claims priority to U.S. Provisional Patent Application No. 61/379,236, filed Sep. 1, 2010, entitled "System and Method for Creative Storytelling Presentation" and U.S. Provisional Patent Application No. 61/379,037, filed Sep. 1, 2010, entitled "System and Method for Presentation Creation," each of which is herein incorporated by reference in its entirety.

COPYRIGHT AND LEGAL NOTICES

A portion of the disclosure of this patent document may contain material which is subject to copyright and/or trademark protection. The copyright and trademark owner to specific portions has no objection to the facsimile reproduction by anyone of the patent document or the patent disclosure, as it appears in the U.S. Patent and Trademark Office patent files and/or records, but otherwise reserves all copyrights and trademark rights whatsoever.

BACKGROUND OF THE INVENTION

Storytelling, as an art, has evolved over centuries from being verbally communicated to electronically communicated. Likewise, within the field of electronic communications, methods and systems for storytelling have progressed.

However, even with such progress, there still exists a need for a platform via which storytelling with tangents and side thoughts can be communicated in an efficient and elegant manner. Further, there exists a need for a platform via which a user or storyteller can check and search on specific topics or subjects within the story and/or tangential story.

SUMMARY OF THE INVENTION

Embodiments of the present invention enhance the overall efficiency and functionality of a user's experience with communicating information and/or receiving information. Such information, for example, is communicated as a story. Embodiments of the present invention provide a network-based content management system (CMS) and method for providing a creative storytelling platform. Embodiments of the present invention provide at least one of a linear and a nonlinear platform via which information and/or at least one story is communicated. Embodiments of the present invention provide such a platform which can be executed or run via a processor, either on the processor or remotely.

Embodiments of the present invention provide for information to be shared via a slide(s). For example, such slide(s) can be an image, text, text with an image, text with a background image, an RSS feed, a feed from a blog, a feed from a Twitter stream, a Vimeo video, etc. Embodiments of the present invention provide for the slides to be grouped together and nested below or above the others slides. Embodiments of the present invention provide for the slides to be associated in a hierarchy which extends horizontally and vertically. Embodiments of the present invention provide for the hierarchical set of slides to be navigated by a user via a keyboard, touchscreen, or other communication means. Embodiments of the present invention provide views to be changed, e.g., from filmstrip to grid view to single slide full screen views. Embodiments of the present invention provide for one or more slides or sets of slides to be password protected.

Embodiments of the present invention provide a presentation slide platform which provides for a nonlinear story to be communicated. Embodiments of the present invention provide a presentation slide platform for communicating at least one nonlinear story and at least one linear story within the same file(s). Embodiments of the present invention provide for a linear set of slides, and for a subset of slides linked or associated with one or more slides of the linear set of slides—thus, providing a nonlinear set of slides.

Embodiments of the present invention provide a presentation slide platform providing for the communication of a nonlinear story in which a user can select or indicate a tag or other identifier so that all presentation slides in the linear and/or nonlinear stor(ies) associated with that tag or other identifier are assimilated. For example, such assimilation is presented to a user as a batch of slides or the like, each of which are associated with that tag or other identifier. For example, a user can return to the full story from the, e.g., filtered slides batch at anytime by clicking a return button provided or a breadcrumb provided or other mechanism.

Embodiments of the present invention provide for a software platform through which a user can display content or review content in a slideshow style presentation. Embodiments of the present invention provide for a software platform to run via a website. Embodiments of the present invention provide for a software platform to run on a website, the website being run on multiple mobile devices. For example, the website and thus the software platform embodiments of the present invention are run using HTML5 allowing for cross-platform performance. Embodiments of the present invention are device-neutral, e.g., they can be used across a variety of different operating systems and devices.

Embodiments of the present invention provide for a web-based, network-created content management system running on a website, providing a creative storytelling platform. Embodiments of the present invention provide for a robust, multimedia platform for such creative storytelling and/or information sharing. Embodiments of the present invention provide for an electronic portfolio of an entity's work, e.g., art, writings, video, etc. Embodiments of the present invention provide for a digital brochure which can provide for story-telling, tangential story-telling, and efficient groupings and assimilations of desired portions of the brochure.

Embodiments of the present invention can be executed on any device. For example, an embodiment of the present invention can be prepared on a desktop computer and later viewed via a laptop computer, a tablet, an iPad, an iPhone, a mobile device, a handheld mobile device, a mobile telephone, a smartphone, a netbook, a web browser device and other devices or access means. Embodiments of the present invention provide for form factors which allow for conformance of the presentation to whatever device is viewing the presentation. Embodiments of the present invention include cross-platform compatibility, providing immediate conformance of a presentation or story for optimal viewing.

Embodiments of the present invention provide a platform allowing for linking, associating, and/or embedding one or more social platforms. Embodiments of the present invention provide a nonlinear presentation slide platform which allow for embedding of videos from a different platform, e.g., You-Tube, Vimeo, storage medium, cloud. Embodiments of the present invention provide a nonlinear presentation slide platform which allow for dynamic and/or static linking, associating, and/or embedding material or feeds from a storage medium or social platform. Such material and feeds can include photos, RSS feed(s), feeds from Tweets, photos and/or videos from Flickr, material from online or harddrive accounts or other electronic storage locations, videos, links from blog(s), and other embeddable/linkable/associatable files.

Embodiments of the present invention can be hosted on a remote server or device, a cloud, or a personal server or device. Embodiments of the present invention can be downloaded onto a personal device, e.g., a laptop computer or storage medium.

BRIEF DESCRIPTION OF THE DRAWINGS

FIG. 8 shows an example embodiment of the present invention.

FIG. 9 shows an example embodiment of the present invention.

FIG. 10 shows an example embodiment of the present invention.

FIG. 11 shows an example embodiment of the present invention.

FIG. 12B shows an example embodiment of the present invention.

FIG. 13 shows an example embodiment of the present invention.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
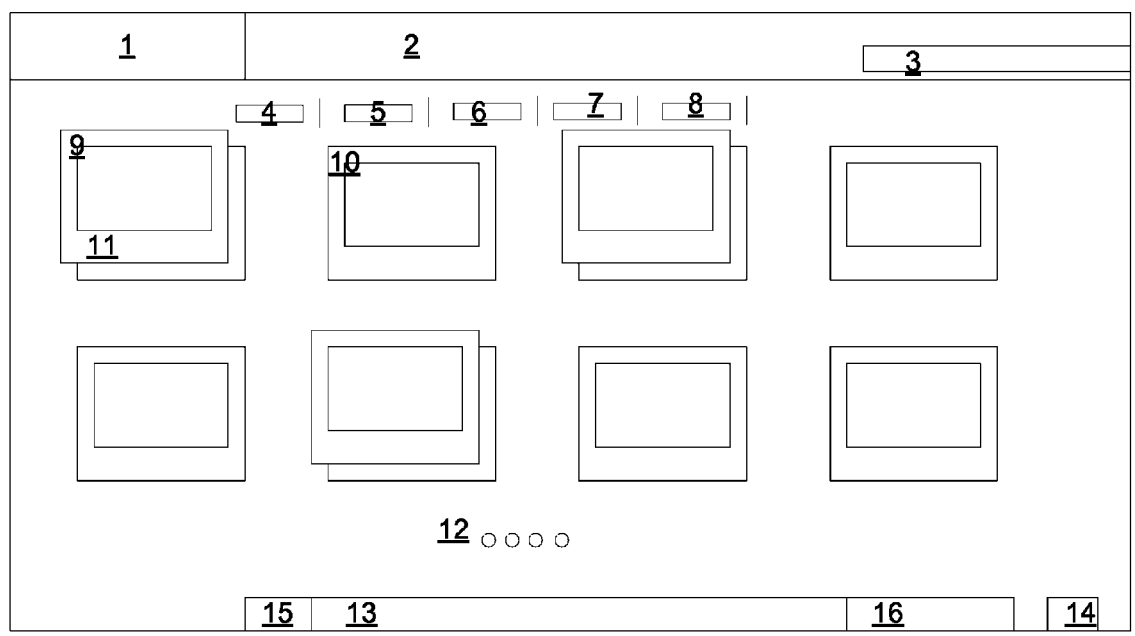
FIG. 1 shows an example grid view of an embodiment of the present invention.

FIG. 1 shows a grid view of an embodiment of the present invention. In FIG. 1, the logo 1 of a user or entity can be displayed. In an example, the logo 1 for the site is defined by the content editor on the Administration Panel, Display Options page. A click on the logo 1 can be made to be non-functional or can be made to reload the home page of the site as defined by, for example, the content editor on the Administration Panel, Display Options page. In FIG. 1, the title bar 2 displays the current title/position within the site. In grid view (as shown), the title bar displays the current "lightbox" name. For example, as shown here, the root/master lightbox title is not displayed. However, in slide view, the title bar may display the title of the current slide/lightbox.

For user initiated searches or filters, for example, the title bar 2 can be used to display the search string or filter term. For example, if the title bar length cannot accommodate the nested lightbox names, the lightbox titles "backflow" to hide higher level lightboxes (e.g. " . . . Lightbox 3\Lightbox 4\Lightbox 5"). The search box 3 allows for a text entry field. The search box 3 can accept all ascii characters. If one clicks on the magnifying glass icon or press the return key, the entered text is submitted to the search engine. The search engine can be a search engine available for use in any given systems today. The slide view 4 provides for a reloading of the page in Slide View, beginning with the first slide/lightbox of the current page. If the active view is already in slide view, the on click is non-functional. The grid view 5 provides for a reloading of the page in Grid View. If the active view is already grid view, then the on click is non-functional. The grid view 5 displays slides/lightboxes in a grid determined by the user's monitor resolution. Content in grid view may be displayed in 4:3 aspect ratio, regardless of original content dimensions. Full Size 6 provides for an on click which reloads the page in Full Size View. If the current view is grid view, full size view will begin with the slide in the upper, left hand corner. If the current view is grid view, full size view will begin with the currently viewed slide. If the active view is already full size, then the on click is non-functional.

Background toggle 7 provides for an on click which loads the alternate color palette as defined by, e.g., the content editor on the Administration Panel, Display Options page. If the alternate color palette is currently displayed, on click loads the default color palette. Share 8 provides for an on click which opens the sharing options lightbox panel.

Lightboxes 9 are ordered collections of individual slides. The slide appearing first in the user-defined slide order becomes the representative slide in grid and thumbnail views. Lightboxes are visually differentiated from slides by the appearance of a staggered stacking of slides connoting multiple content elements. The on click of a lightbox in grid view displays the lightbox in a selected state. The on double click of a lightbox in grid view opens the selected lightbox in grid view. The content in grid view is displayed in 4:3 aspect ratio, regardless of original content dimensions. Slide 10 provides representations of individual content elements. The on click of a slide in grid view displays the slide in a selected state. The on double click of a slide in grid view opens the selected slide in slide view. For example, the content in grid view is displayed in 4:3 aspect ratio, regardless of original content dimensions.

Slide/lightbox title 11 provides for the titles for lightboxes or slides which are defined by the user at time of content creation. Slide titles may contain any alphanumeric characters (A-Z, 0-9) as well as HTML supported special ASCII characters. The character limit can be made. Pagination 12 provides for a visual representation of the both the total number of pages in the current lightbox and current page. In an embodiment, pagination allows for a maximum of 10 pages, for a limit of 80 slides/child lightboxes within each parent lightbox. The on click of a dot advances the view to the corresponding page without requiring a page refresh. Pages are also navigable by using the left and right arrow keys, which advance the page in the corresponding direction. If only one page exists within the currently selected lightbox, these page indicators are not displayed. Footer 13 of the page contains filters defined by, e.g., the content editor on the Administration Panel, Manage Filters page. The on click of a filter reloads page showing all content within the site corresponding to the selected filter in grid view. If no filters have been added, this copy and all links are not displayed. The footer also displays non-functional 'Powered by LIGHTBOX' copy, copyright, and privacy policy link here in this example. The on click of the privacy policy link is provided to open the privacy policy in a lightbox overlay.

Social media links 14 provide for the display of social media links is determined by, e.g., the content editor on the Administration Panel, Display Options page. Social media links can be limited to, e.g., Twitter and Facebook, or allow other social media site links. The on click of the social media links opens the corresponding link in a new window. The Footer Lightbox/CMS logo 15, 16 may be used to indicate that an unpaid user accounts needs to be satisfied before a user can create their own lightbox. The on click of the logo or the CTA opens the Lightbox CMS site in a new window. Paid accounts may disable the display of these elements.

Figure 2:
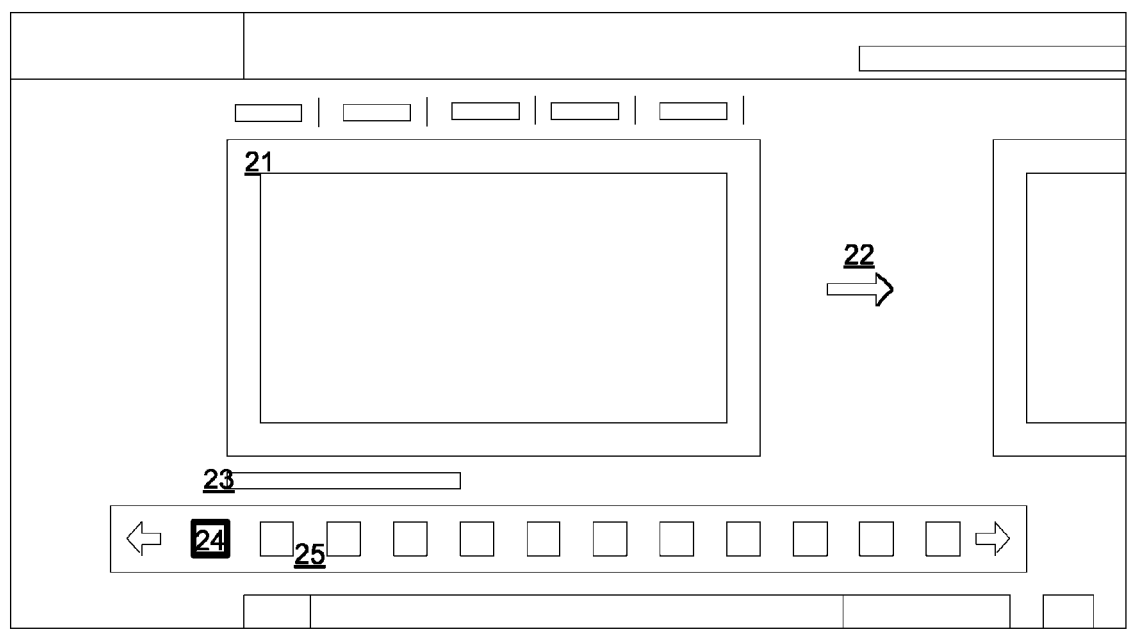
FIG. 2 shows an example embodiment of the present invention.

In FIG. 2, a slide view of an embodiment is shown. Slide 21 provides a display is focused on a single content element at a time, presented in a linear fashion as ordered by the content editor. The on click of a slide or lightbox in slide view displays the slide/lightbox in a selected state. The on click of an adjacent slide advances the slide view in the corresponding direction. The on double click of a lightbox in slide view opens the selected lightbox in slide view. Slide Navigation 22 provides content elements which may be navigated in three ways in slide view. Upon the user's cursor position moving sufficiently left or right, a directional arrow is displayed. The on click of the arrow advances the slide display in the corresponding direction. If no slide exists in the direction corresponding to the cursor position, no arrow is displayed. Users may click and hold a slide and drag either right or left to advance the slide in the corresponding direction. If no slide exists in the direction corresponding to the user's swipe, the slide does not advance. Slides may also be navigated through use of the slide carousel below. Slides are also navigable by using the left and right arrow keys, which advance the slide in the corresponding direction.

Content tags 23 are added to each slide upon slide creation. Content tags are only displayed in slide and full view, they are not displayed in grid view. The on click of a tag reloads the page to display all content tagged with the selected content tag in grid view. If no tags are associated with the current slide, the 'Tags:' copy is not displayed. Carousel navigation 24 is a slide view carousel which displays 10 (or other number) thumbnails at a time. The on click of the directional arrows advances the carousel 10 places in the corresponding direction. If the active slide is in the first or last position in the carousel and the user advances the slide using the slide navigation described in TAG 2, the carousel advances accordingly. Carousel navigation 25 is a thumbnail corresponding to the currently displayed slide is displayed in a highlighted or active state. The on click of a thumbnail advances the slides to the selected slide position without refreshing the page. In the carousel content wraps continuously. Thus, if the last thumbnail is positioned to the left of the first slide and at the end of the slide order, advancing will bring the user back to the first slide.

Figure 3:
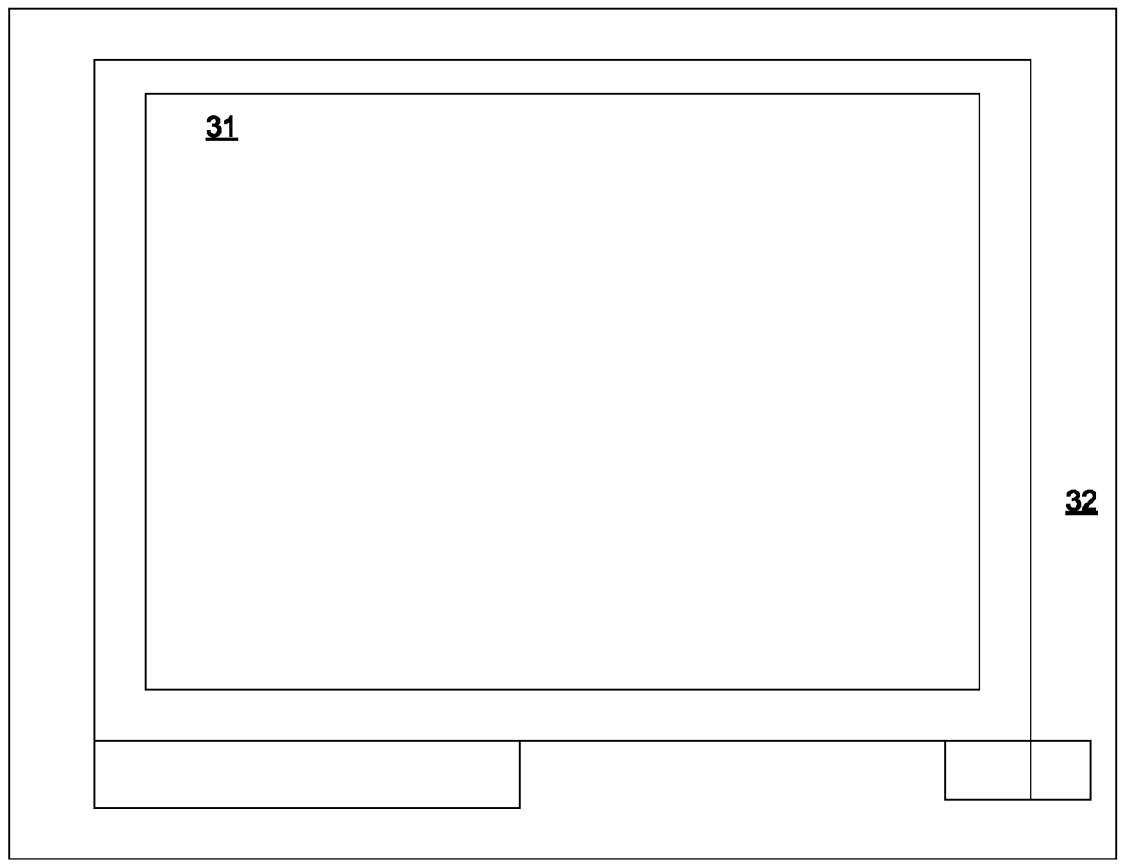
FIG. 3 shows an example embodiment of the present invention.

In FIG. 3, a full view of the slide is shown. In full view 31, the size of content displayed in full view is dependent upon the user's monitor resolution and browser window size. The content is displayed as large as possible given the viewable window size while accommodating the slide title and content tags. The content size will not exceed the dimensions of the original content asset uploaded. Full view may be exited by using the view toggle buttons, for example, or by pressing the 'Esc' key. If the user presses the 'Esc' key to exit full view the view returns to the previously selected view. Slide navigation 32 provides that upon the user's cursor position moving sufficiently left or right, a directional arrow is displayed. On click of the arrow advances the slide display in the corresponding direction. If no slide exists in the direction corresponding to the cursor position, no arrow is displayed. Users may click and hold a slide and drag either right or left to advance the slide in the corresponding direction. If no slide exists in the direction corresponding to the user's swipe, the slide does not advance. Full view controls can be shown at the bottom area below the slide. The controls can be shown for a few moments, and then retracted. Upon the user's cursor position moving sufficiently up or down, both panels slide back into view until the cursor leaves the area.

Figure 4:
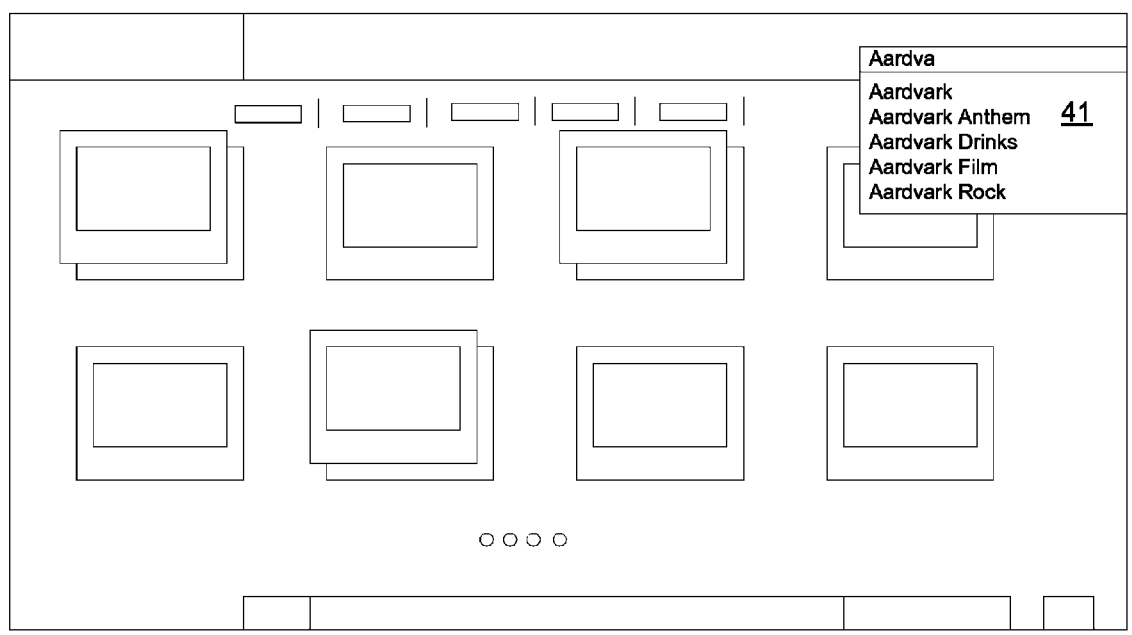
FIG. 4 shows an example embodiment of the present invention.
Figure 5:
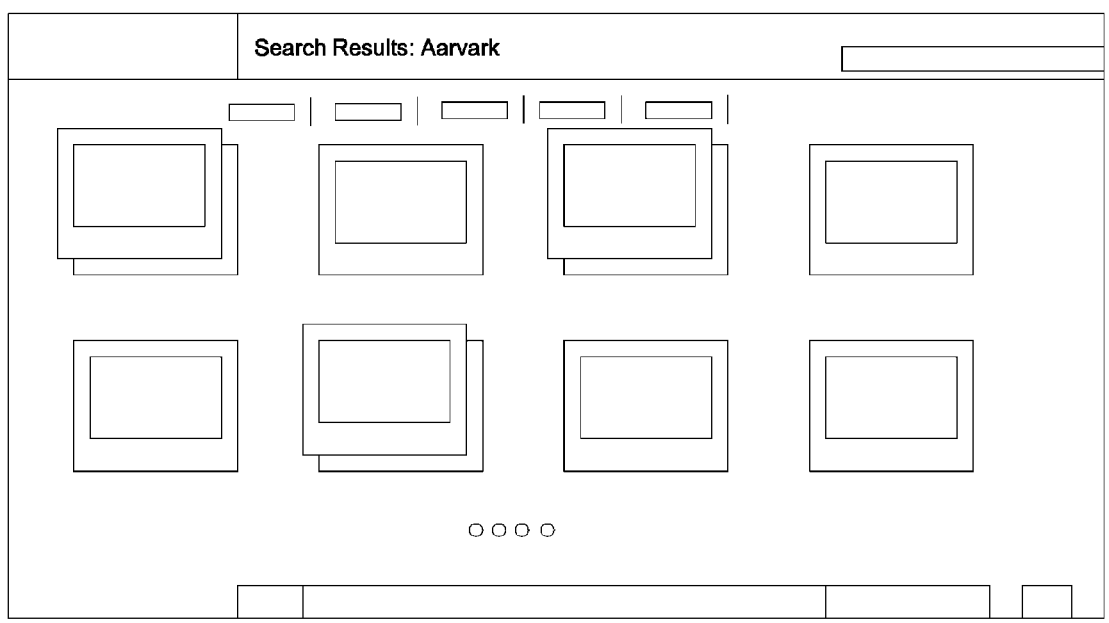
FIG. 5 shows an example embodiment of the present invention.

In FIG. 4, a search of the slides can be found. A dropdown or text field 41 can be provided. Related content can be displayed in a drop down box. In FIG. 5, an example of how the search results are displayed is shown.

Figure 6:
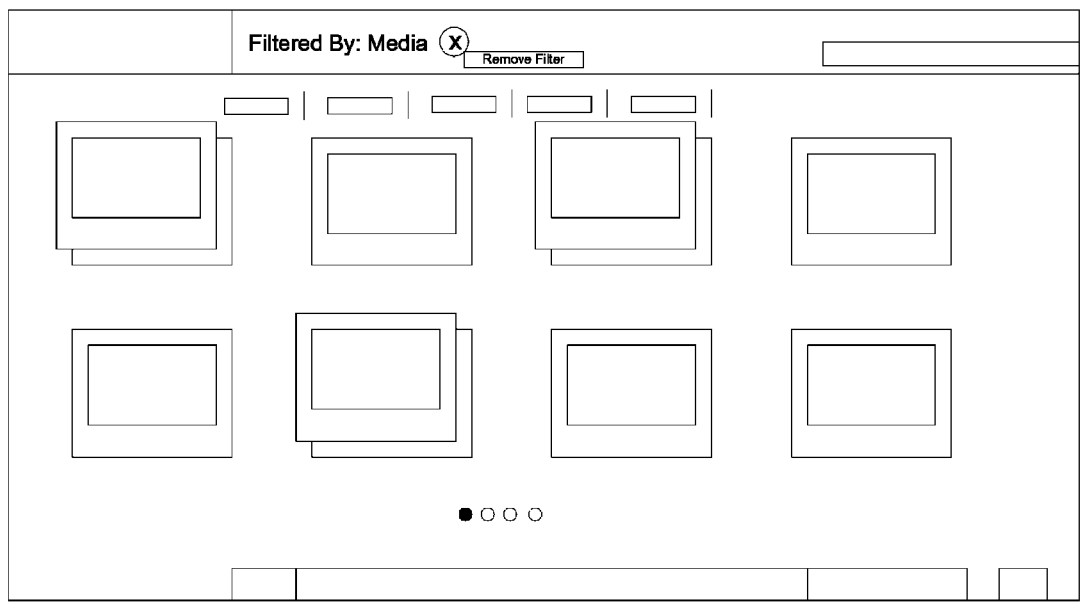
FIG. 6 shows an example embodiment of the present invention.

In FIG. 6, an example of a filtered view showing the slides associated with a tag term is shown. Following a submitted search, all slides/lightboxes related to the submitted query are displayed in grid view, ordered alphabetically. On double click of any of the slides/lightboxes within the search results opens the slide/lightbox consistent with standard functionality and places the corresponding lightbox title in the title bar, clearing the search results. Upon selection of a filter or content tag, the title bar displays "FILTERED BY:[FILTER/TAG TERM]. On rollover of the 'X' button displays a tool tip reading "Remove Filter". On click of the 'X' button removes the filter and returns the user to the previous page prior to the filter being selected. On double click of any of the slides/lightboxes within the filtered state opens the slide/lightbox consistent with standard functionality and places the corresponding lightbox title in the title bar, removing the filter.

Figure 7:
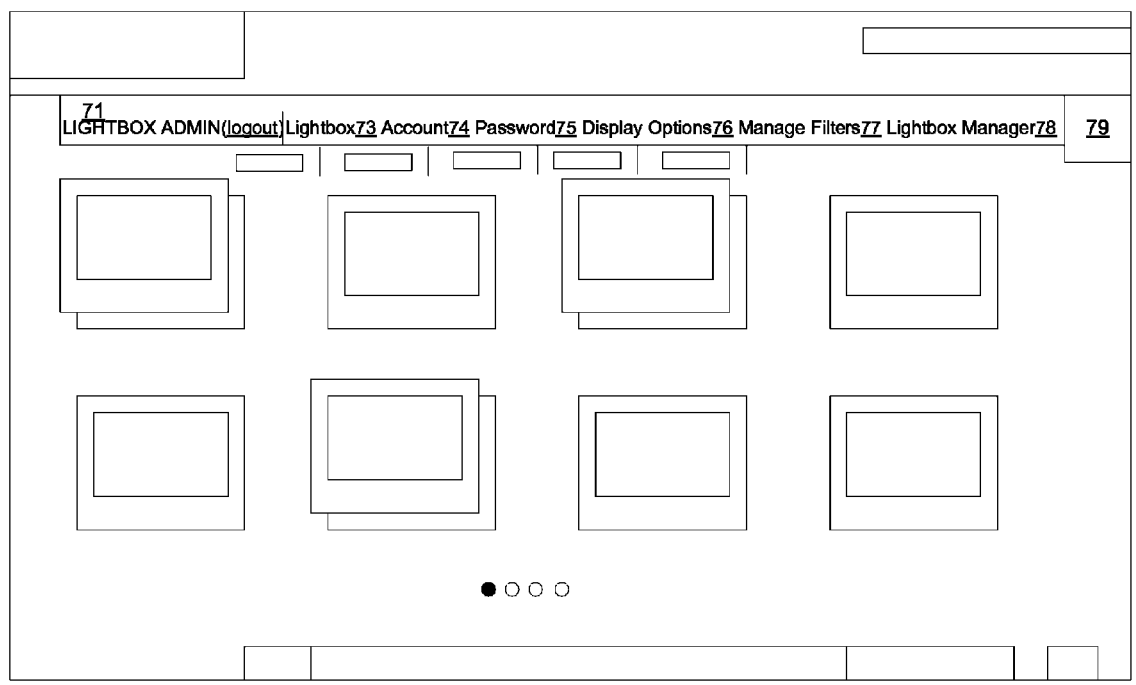
FIG. 7 shows an example embodiment of the present invention.
Figure 12A:
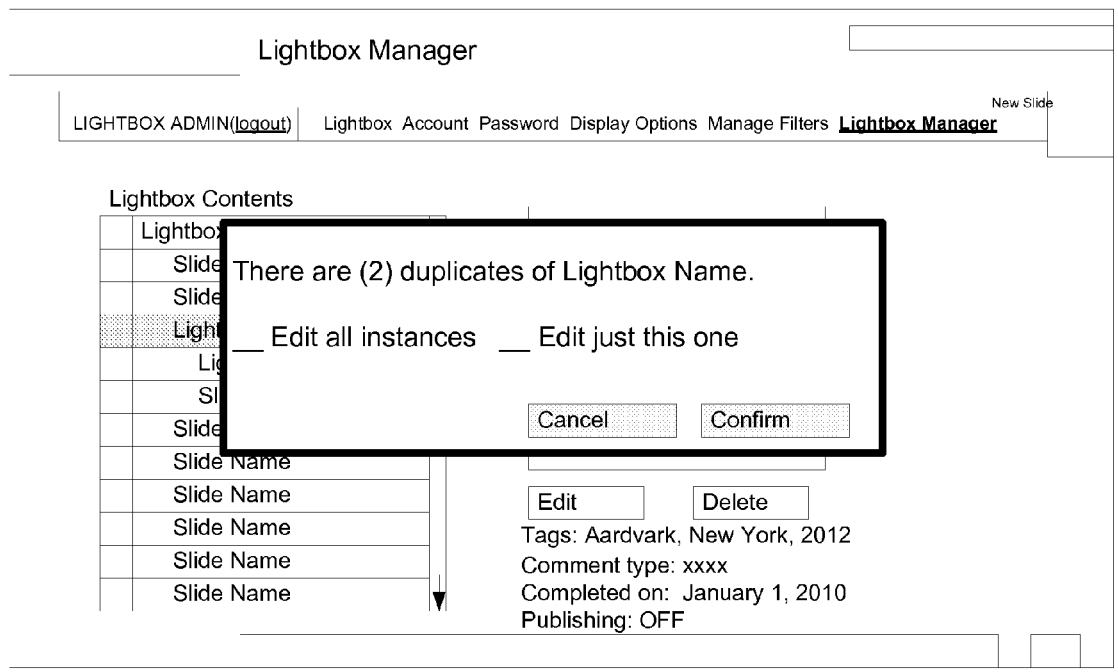
FIG. 12A shows an example embodiment of the present invention.
Figure 14:
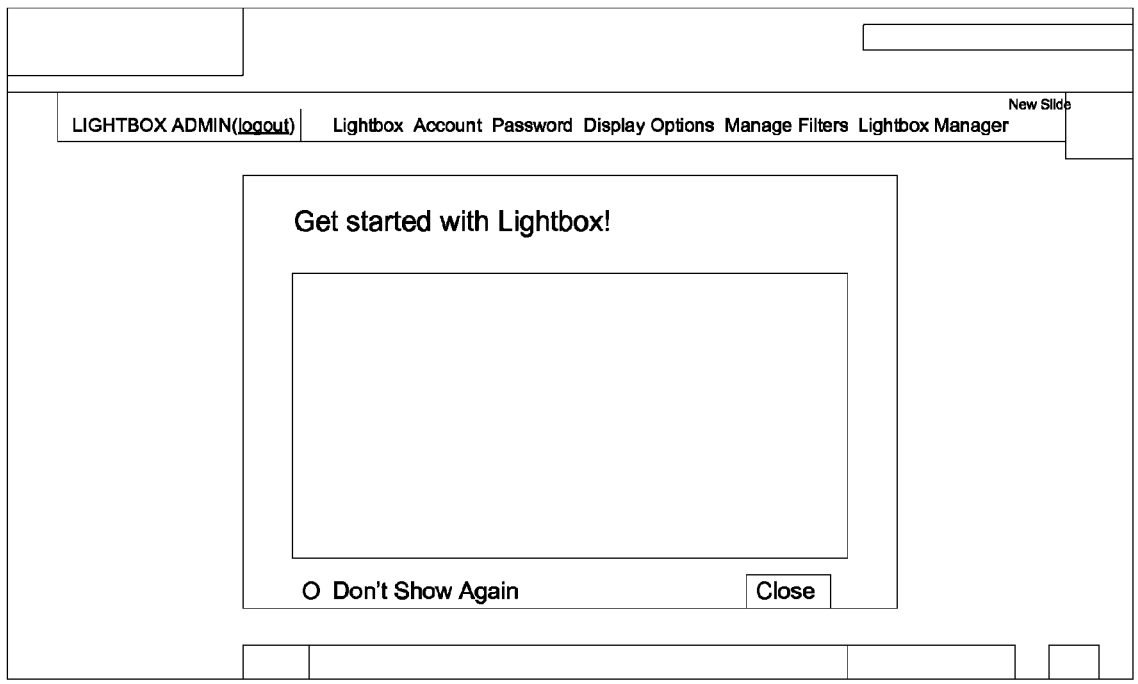
FIG. 14 shows an example embodiment of the present invention.
Figure 15:
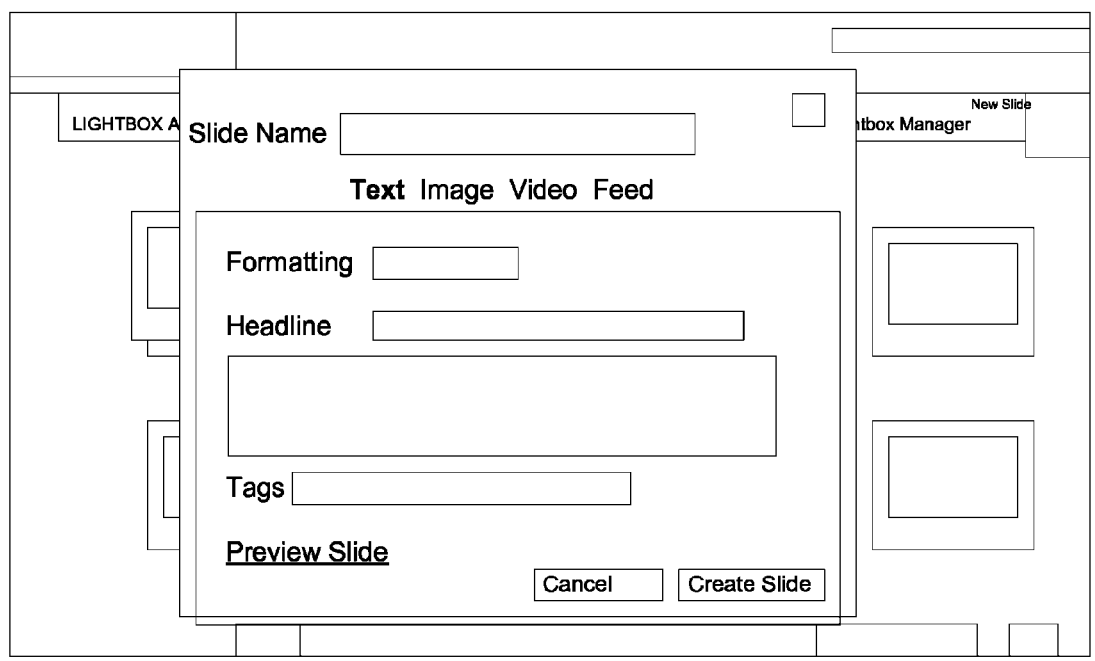
FIG. 15 shows an example embodiment of the present invention.
Figure 16:
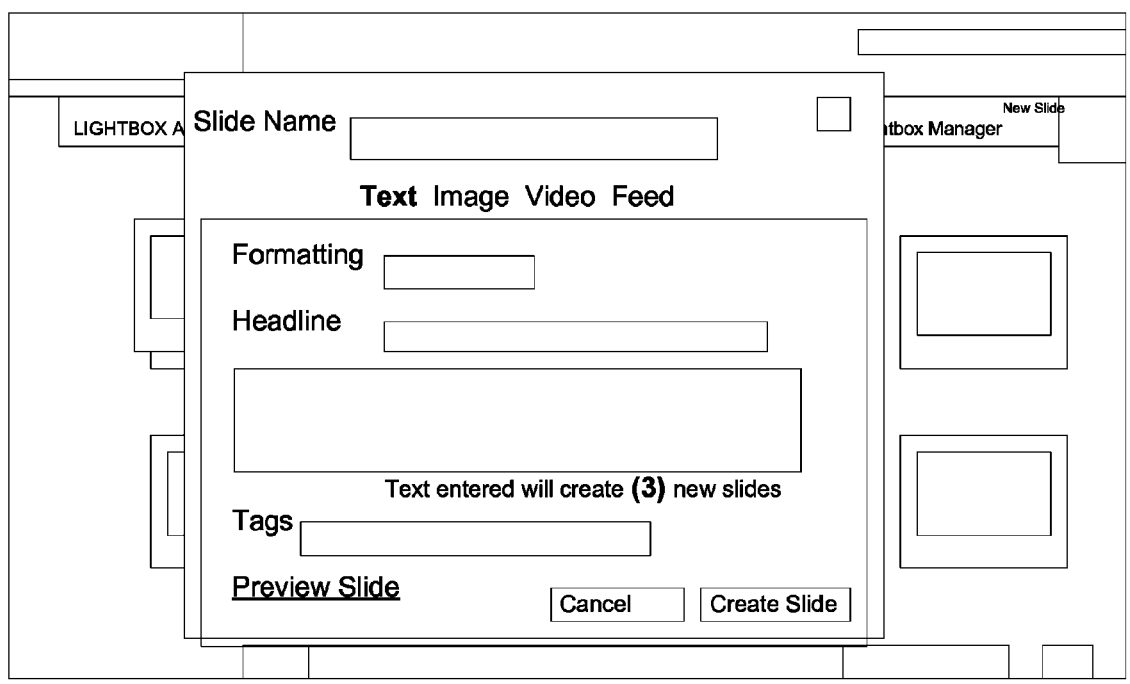
FIG. 16 shows an example embodiment of the present invention.
Figure 17:
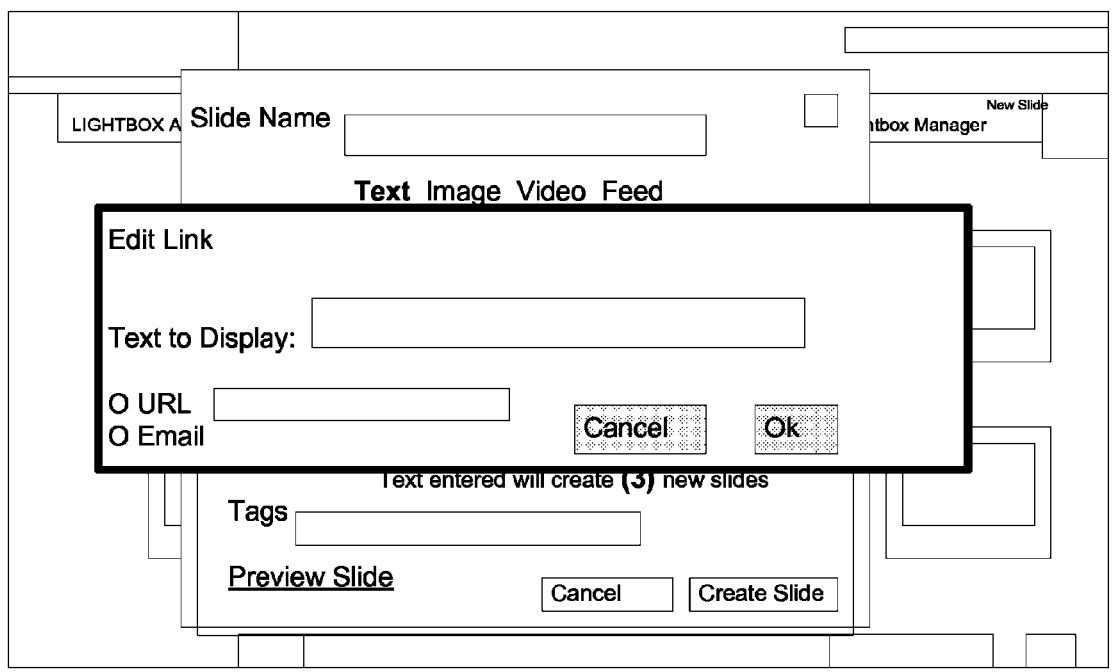
FIG. 17 shows an example embodiment of the present invention.
Figure 18:
FIG. 18 shows an example embodiment of the present invention.
Figure 19:
FIG. 19 shows an example embodiment of the present invention.
Figure 20:
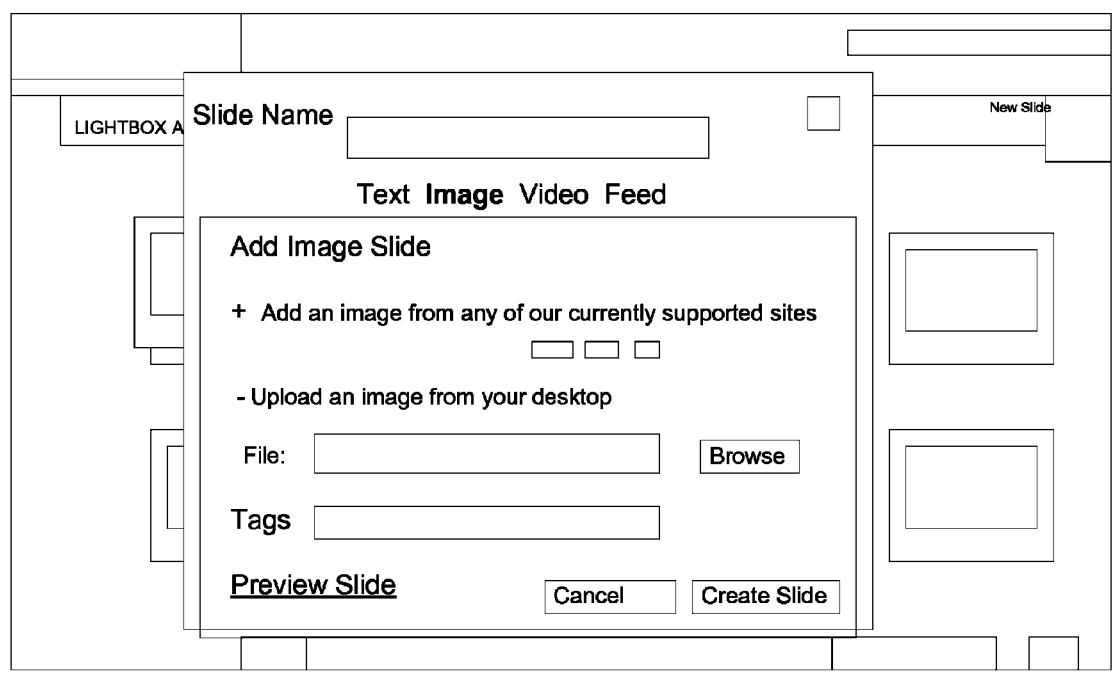
FIG. 20 shows an example embodiment of the present invention.
Figure 21:
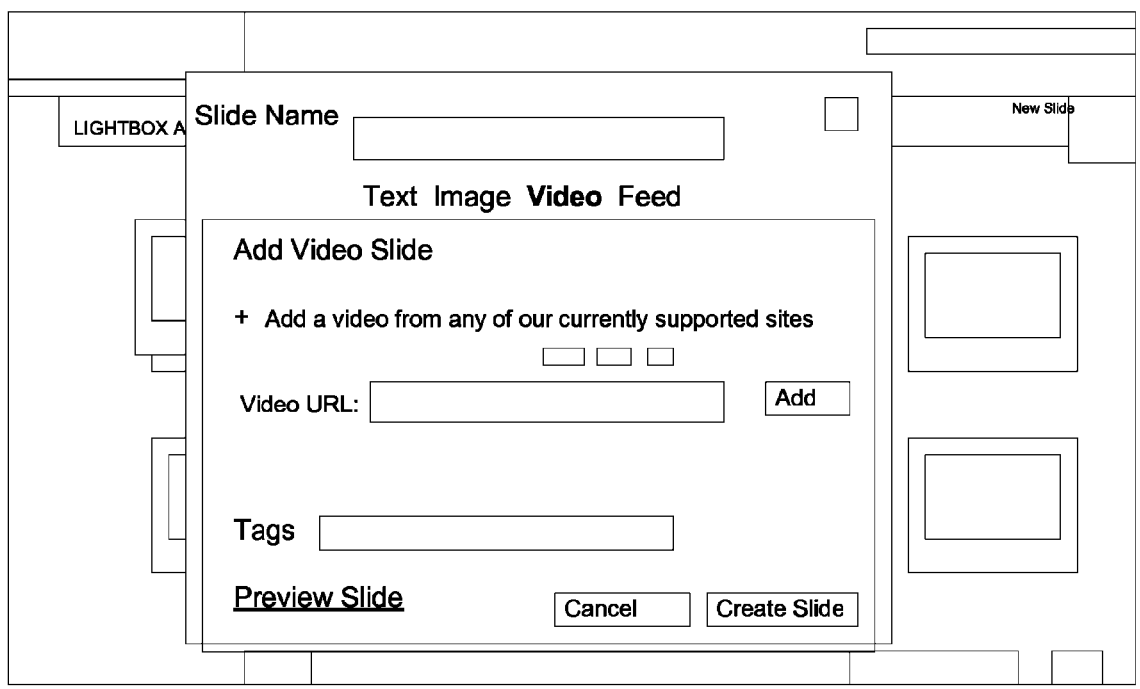
FIG. 21 shows an example embodiment of the present invention.
Figure 22:
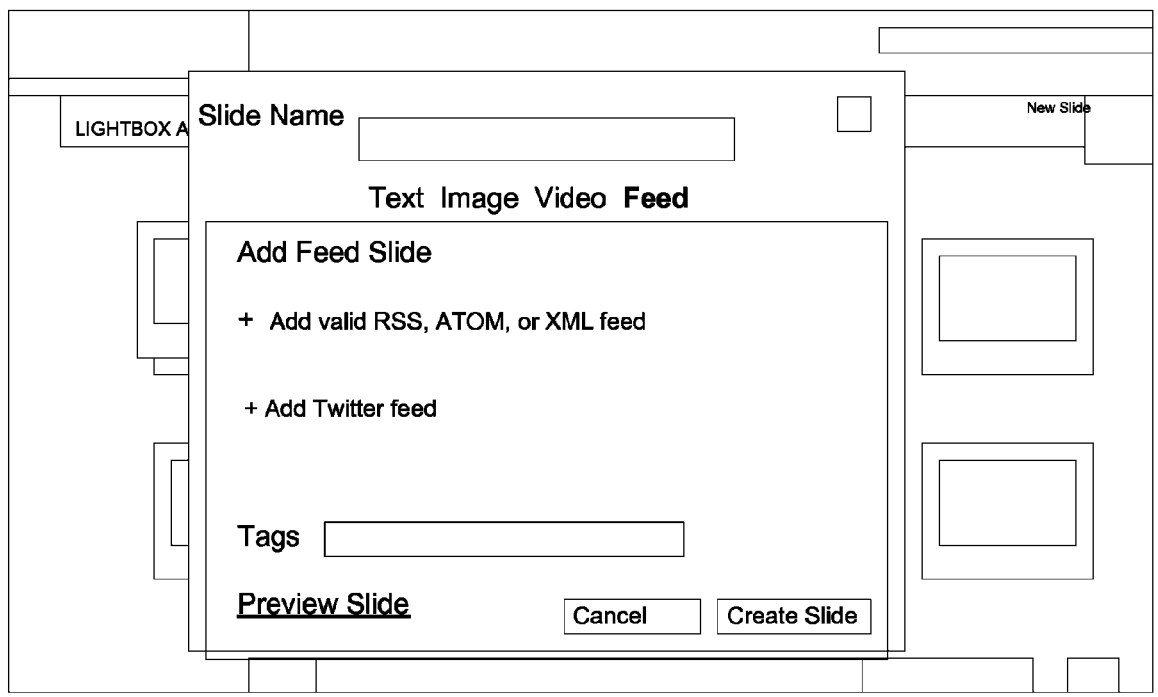
FIG. 22 shows an example embodiment of the present invention.
Figure 23:
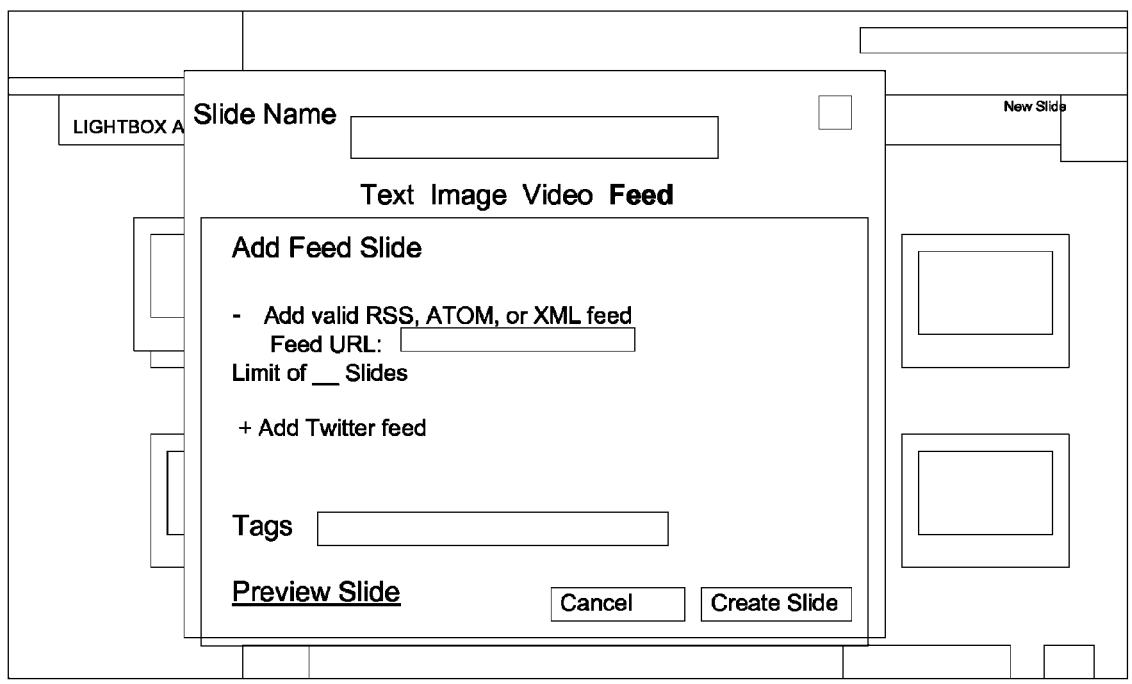
FIG. 23 shows an example embodiment of the present invention.
Figure 24:
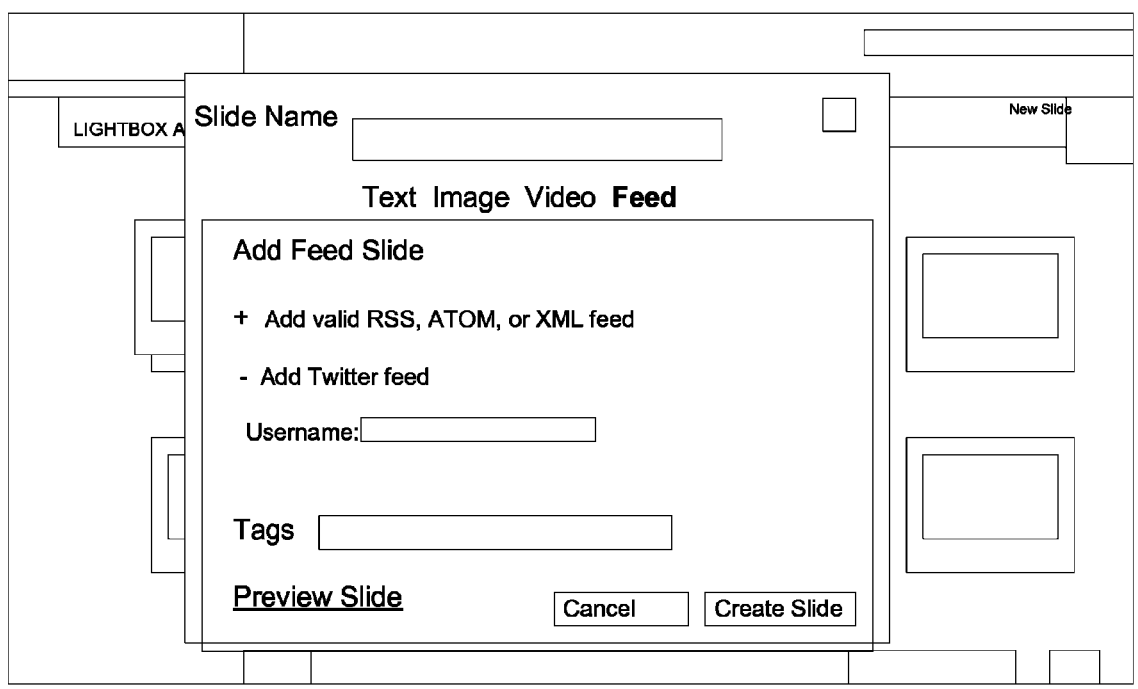
FIG. 24 shows an example embodiment of the present invention.
Figure 25:
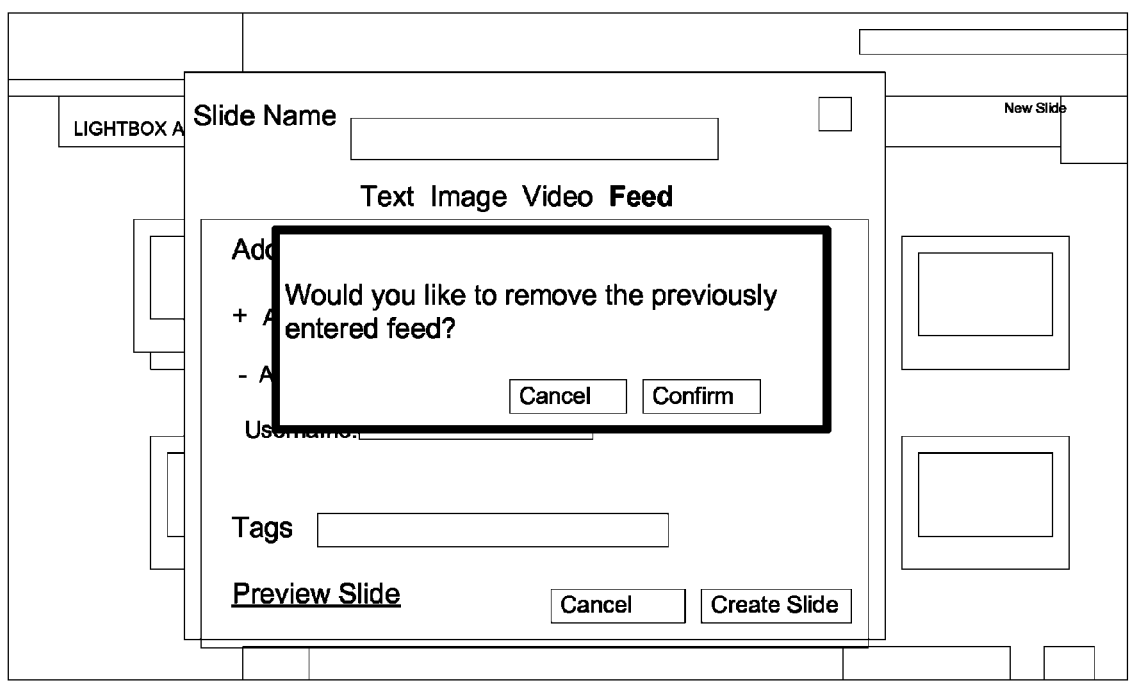
FIG. 25 shows an example embodiment of the present invention.
Figure 26:
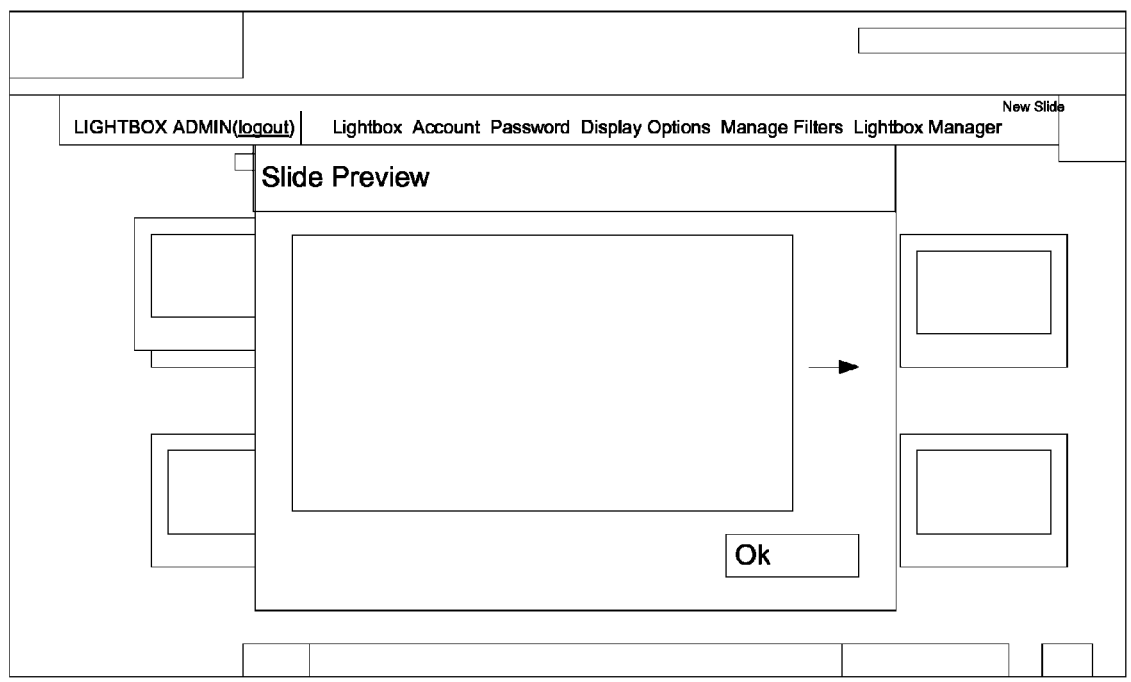
FIG. 26 shows an example embodiment of the present invention.
Figure 27:
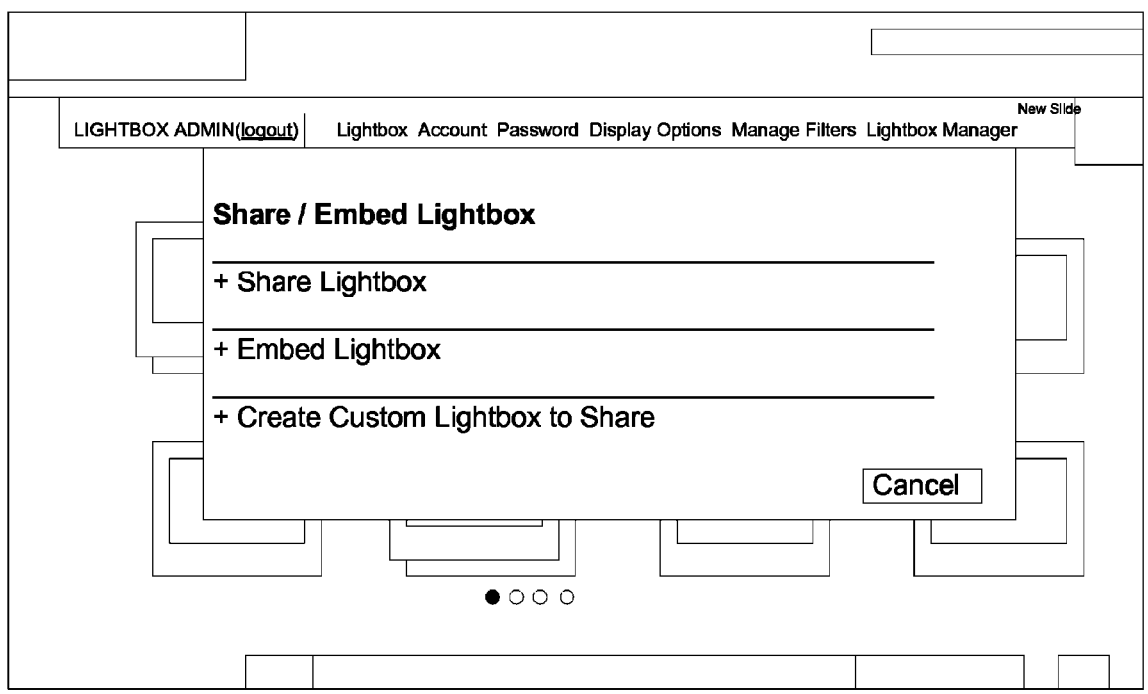
FIG. 27 shows an example embodiment of the present invention.
Figure 28:
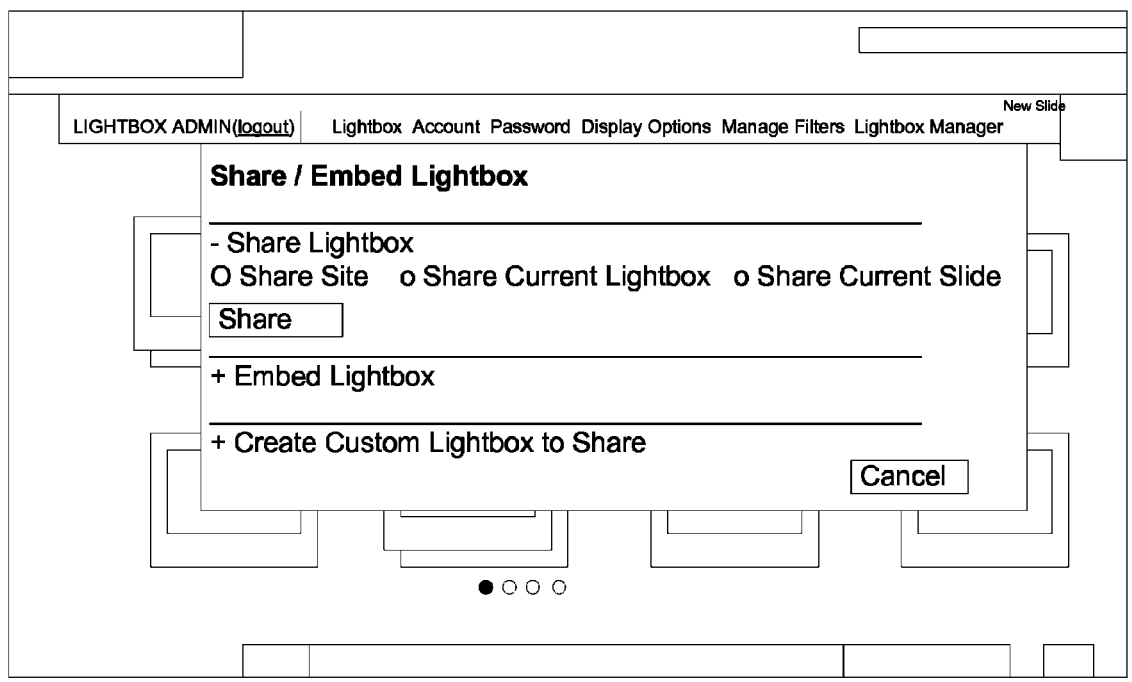
FIG. 28 shows an example embodiment of the present invention.
Figure 29:
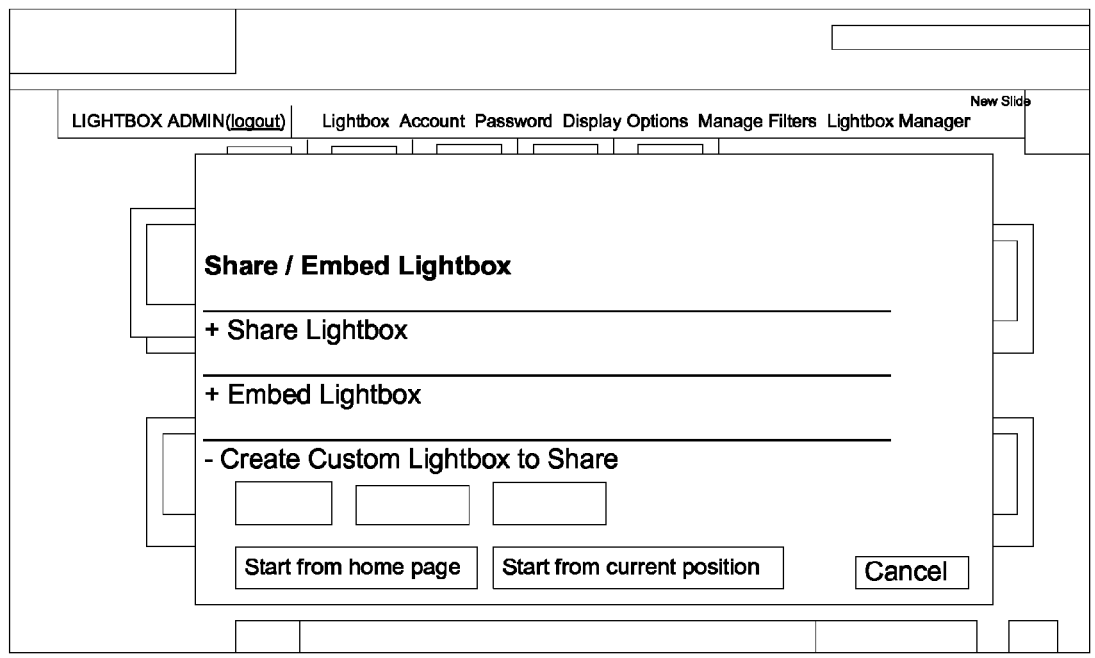
FIG. 29 shows an example embodiment of the present invention.
Figure 30:
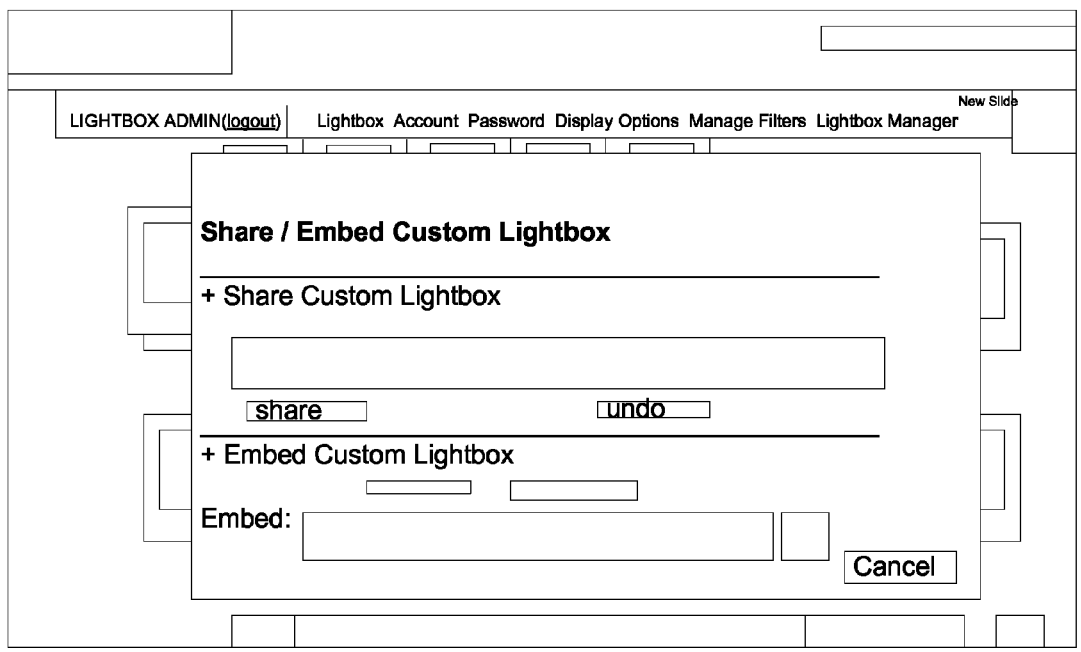
FIG. 30 shows an example embodiment of the present invention.
Figure 31:
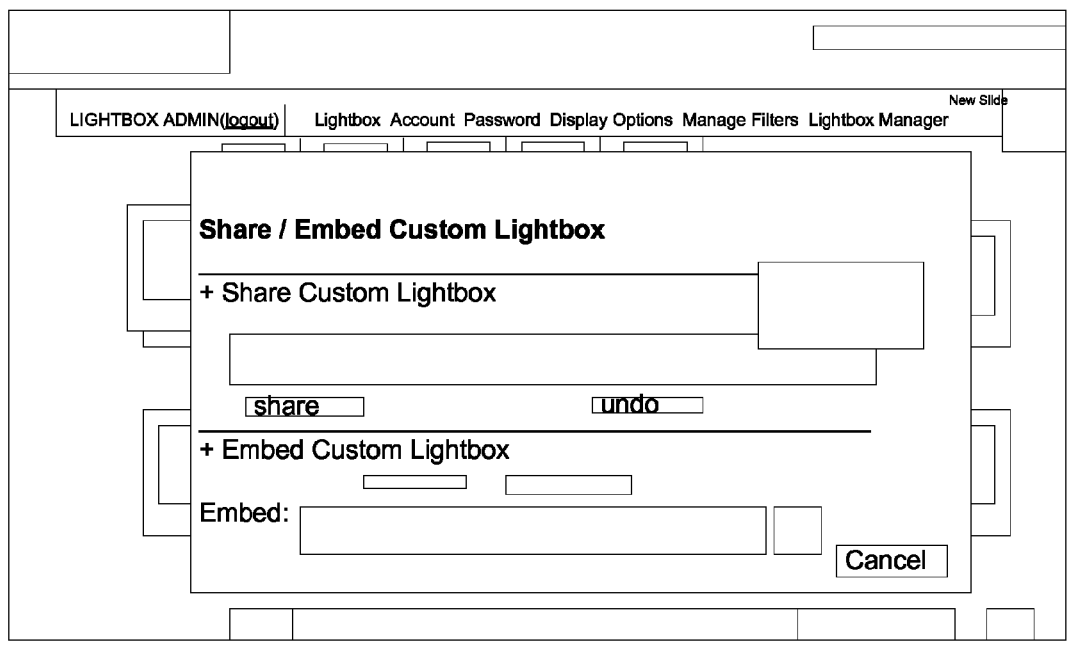
FIG. 31 shows an example embodiment of the present invention.
Figure 32:
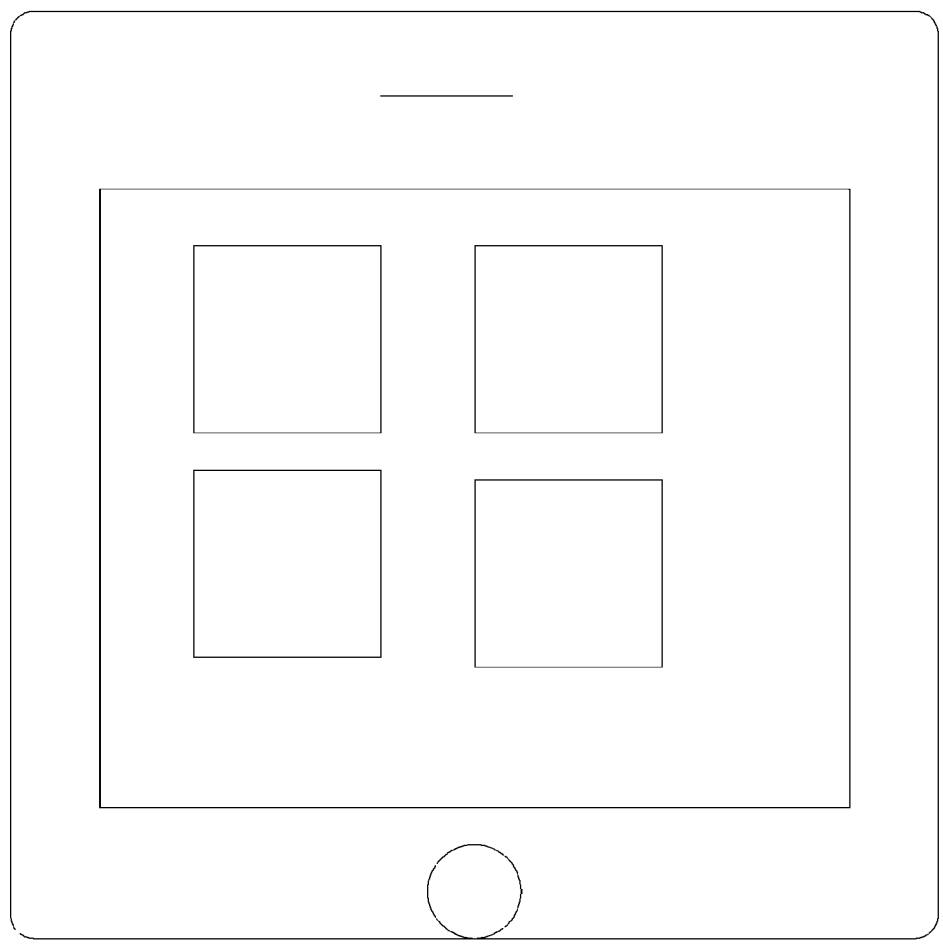
FIG. 32 shows an example embodiment of the present invention.
Figure 33:
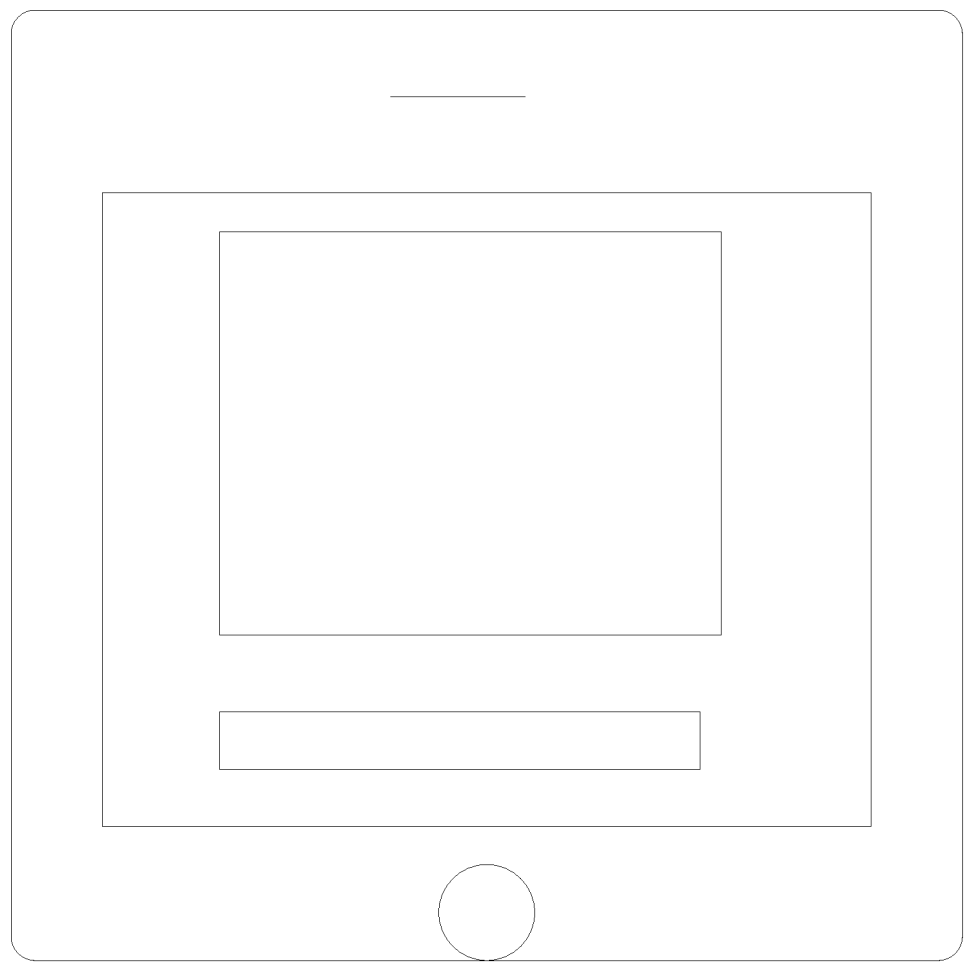
FIG. 33 shows an example embodiment of the present invention.
Figure 34:
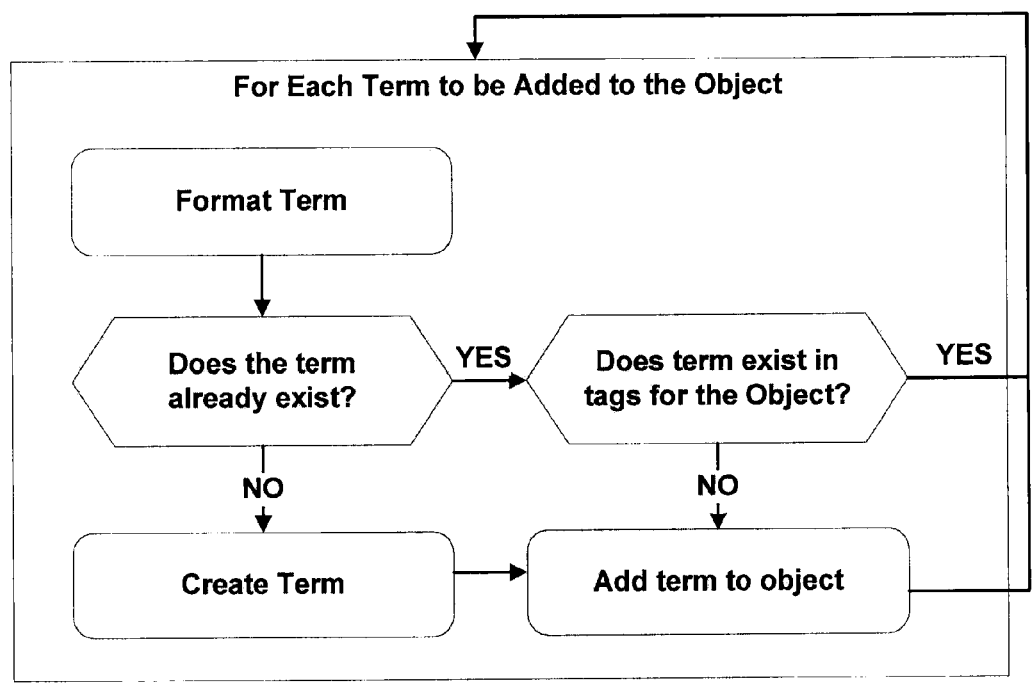
FIG. 34 shows an example embodiment of the present invention.
Figure 35:
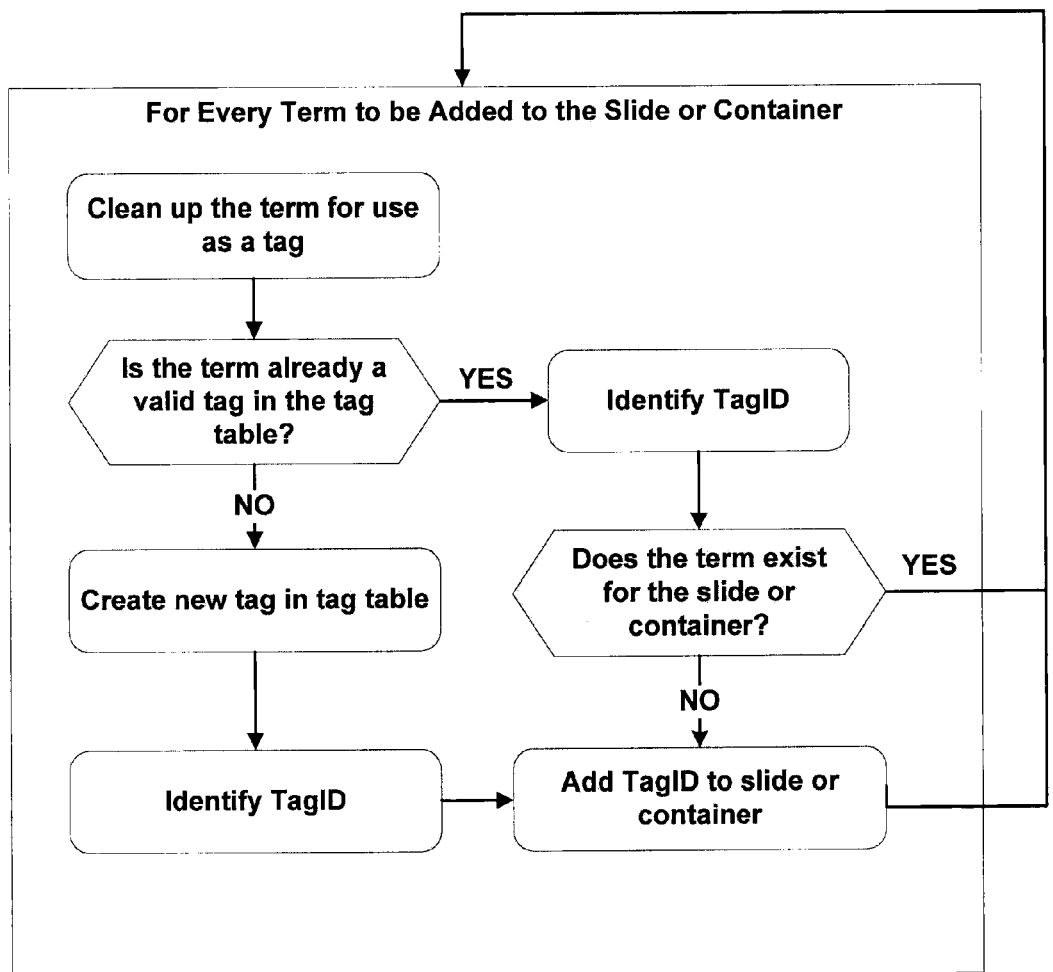
FIG. 35 shows an example embodiment of the present invention.
Figure 36:
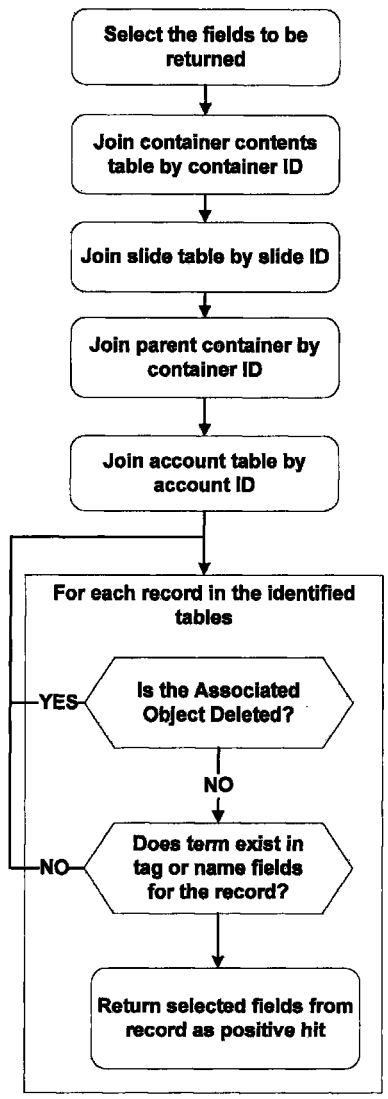
FIG. 36 shows an example embodiment of the present invention.
Figure 37:
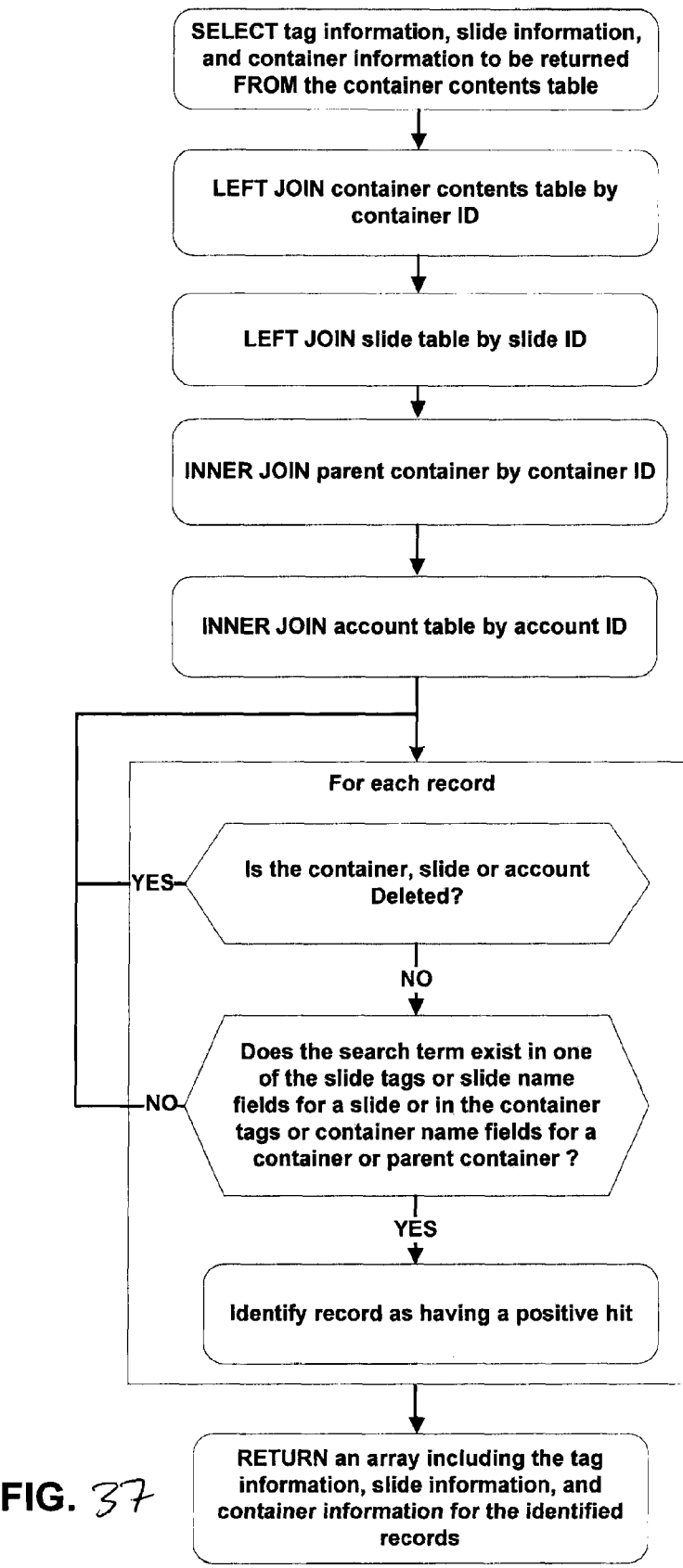
FIG. 37 shows an example embodiment of the present invention.

In FIG. 7, an administrative interface example is shown. In the Admin Toolbar 71, once an administrative user logs in, the Admin Toolbar is displayed allowing for content edits and account setting changes. The selected admin option is displayed in a highlighted or active state. On rollover the corresponding admin item is displayed in a rollover state. Logout 72 provides for a user to sign out upon a click and refreshes the page removing the Admin Toolbar and returning the user to the same page/lightbox view as was last seen while logged in.

Lightbox 73 provides for a default selection upon admin login. Lightbox 73 corresponds to an administrative view that displays the lightbox as seen by end users with the exception of the Admin Toolbar. The administrator may navigate the site as usual in this view. The contextual addition or editing of slides is accomplished in Admin Lightbox view. Account 74 allows the administrator to change username, email address, language, sharing, and privacy options. Password 75 allows the administrator to change the admin password. Display options 76 allows the administrator to make changes to the interface and other editable display options. Manage filters 77 allows the administrator to create filters that are displayed in the footer from content tags. Lightbox Manager 78 allows the administrator to make batch edits, organize the lightbox, set publishing options, and assign lightbox types.

New slide 79 allows for the adding of new slides by dragging and dropping this new slide icon onto the lightbox "stage". Adding new slides using this method is only possible when 'Lightbox' is selected within the Admin Toolbar, otherwise this selection is grayed out/inactive. Once the user has dragged the 'New Slide' icon from the originating position, the 'New Slide' icon is replaced with a dotted line or other indication to infer that the user has moved the new slide from the Admin Toolbar. When the new slide enters the lightbox view area, a line is displayed at the position that the new slide will be added on release given the current cursor position. On release of the new slide, the slides reorient (moving the slide in position to the next page), the slide flips over or otherwise animates to display the new slide content overlay which defaults to text entry. If fewer than 8 slides are present in grid view and the user drops the slide after the terminal slide, the slide will assume the end position in the ordering. While in the Admin>Lightbox view, the content editor may rearrange slides by clicking and holding, then dragging the slide to a new position. When the slide being moved traverses the lightbox view area, a line is displayed at the position that the slide will move to upon release given the current cursor position. The previous position is marked with a dotted line or other indication, "holding" the space and not allowing other slides to reorient until the user releases the mouse button. If the slide is dragged sufficiently left or right, the page will advance allowing the user to move a slide across pages. On release of the slide, the slides reorient, shifting position to accommodate the moved slide. While in the Admin>Lightbox view, on rollover of a slide or lightbox, an edit button corresponding to the slide/lightbox is displayed. On click of the edit button opens the edit slide overlay panel corresponding to the content type (text, image, video, feed) of the slide/lightbox. While in the Admin>Lightbox view, on rollover of a slide or lightbox, a delete button corresponding to the slide/lightbox is displayed. On click of the delete button a confirmation dialog box is displayed. Upon deletion of a slide/lightbox, the slides reorient to fill the vacated space. If the user deletes the last slide in a child lightbox, the view reverts to the parent lightbox on the page where the deleted lightbox appeared. If the user deletes the last slide in the master lightbox, the view reverts to the "first slide" view. The on click of the 'Delete' button corresponding to an existing slide or lightbox this confirmation dialog box is displayed. The copy changes depending on the type and name of the content being deleted. The on click of the 'Cancel' button, the dialog box disappears and no content is affected. The on click of the 'Confirm' button, the dialog box disappears, the content is deleted, and the remaining slides are reordered. If the slide being deleted is the only slide in the site, the view returns to the First Slide view.

When adding a new slide or moving a current slide/lightbox, the content editor may add the slide/lightbox to an existing lightbox or create a new lightbox by adding a slide to an existing slide. When a new slide or slide/lightbox being moved is sufficiently above an existing slide and held in position for ~2 seconds, the line indicating a move or insertion point changes to a hover state over the slide/lightbox below. On release of the mouse button, a dialog box confirming the addition to the other content item is displayed. If the slide/lightbox added to the below slide/lightbox was being moved, upon confirmation of the addition, the slides reorient but the view does not change. If the slide added to the below slide/lightbox was a new slide, the view changes to display the contents of the lightbox being added to and the new slide content overlay is displayed.

In an example, a new slide is added to an existing slide (results in the creation of a new lightbox), then confirmation dialog box is displayed, view changes to the newly created lightbox, and the new slide content overlay is displayed. If a new slide is added to an existing lightbox, then confirmation dialog box is displayed, and new slide content overlay is displayed. If an existing slide is added to existing slide (results in the creation of a new lightbox), then confirmation dialog box is displayed. If an existing slide is added to existing lightbox, then confirmation dialog box is displayed. Upon addition of a slide/lightbox to an existing lightbox this confirmation dialog box is displayed. The copy changes depending on the type of content being added and the type of content being added to. The on click of the 'Cancel' button, the dialog box disappears and no content is effected. The on click of the 'Confirm' button, the dialog box disappears and the content is added.

The account tab is displayed in its selected/active state.

The username entered by the user effects the URL of the user's lightbox following the format: http://www.lightbox.com/[username] or similar. The email field is provided on a screen to allow for submission of a form/correspondence. A language selector may be provided. An administrator has right to turn on and off the ability to share a lightbox or lightbox content. An administrator can allow guest logins, passwords or other security measures.

A browse button is provided to allow for an on click that opens the user's OS dialog box allowing them to select an image from their computer. Upon selection of a valid image (.jpg, .gif, .png), the selected image begins to upload and the button changes to state (b). Upon successful upload of image, the button changes to state (c) allowing the user to remove the entered image. On click of the remove link removes the image from the system and returns the button to state (a).

Upon successful upload of the selected image, the image is resized to a maximum size of 120×36 px (TBD on visual design) and displayed at 100% image size here. Prior to upload of an image by the user, the image displayed is a default/placeholder image of the Lightbox CMS service. A user can add or remove text, links, etc. upon clicks of the appropriately labeled buttons/options. If the current image is the default/placeholder image, on click removes the image and no header image is displayed. If no image is specified as the header image, this link is not displayed.

Figure 9:
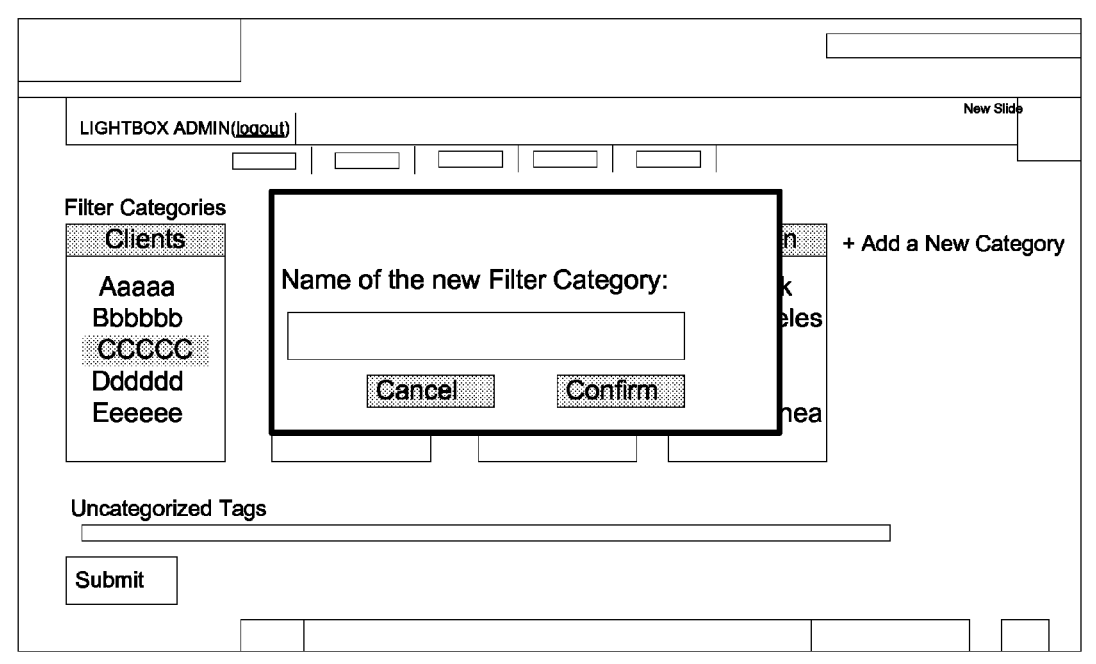
Figure 11:
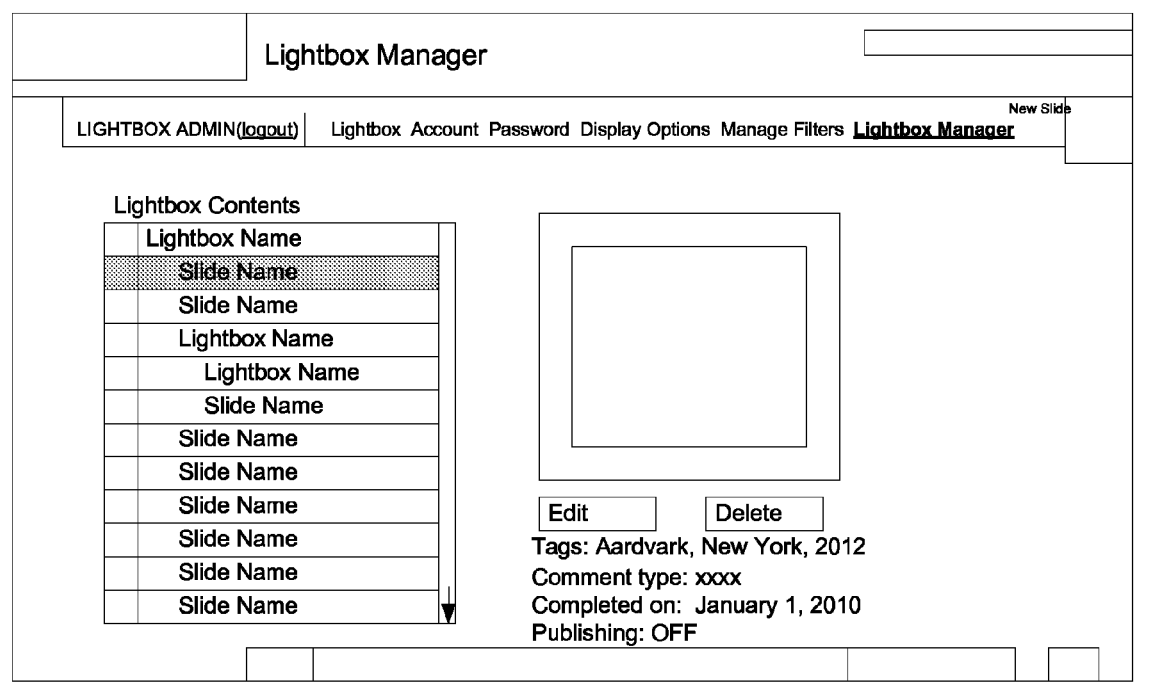
Figure 12B:
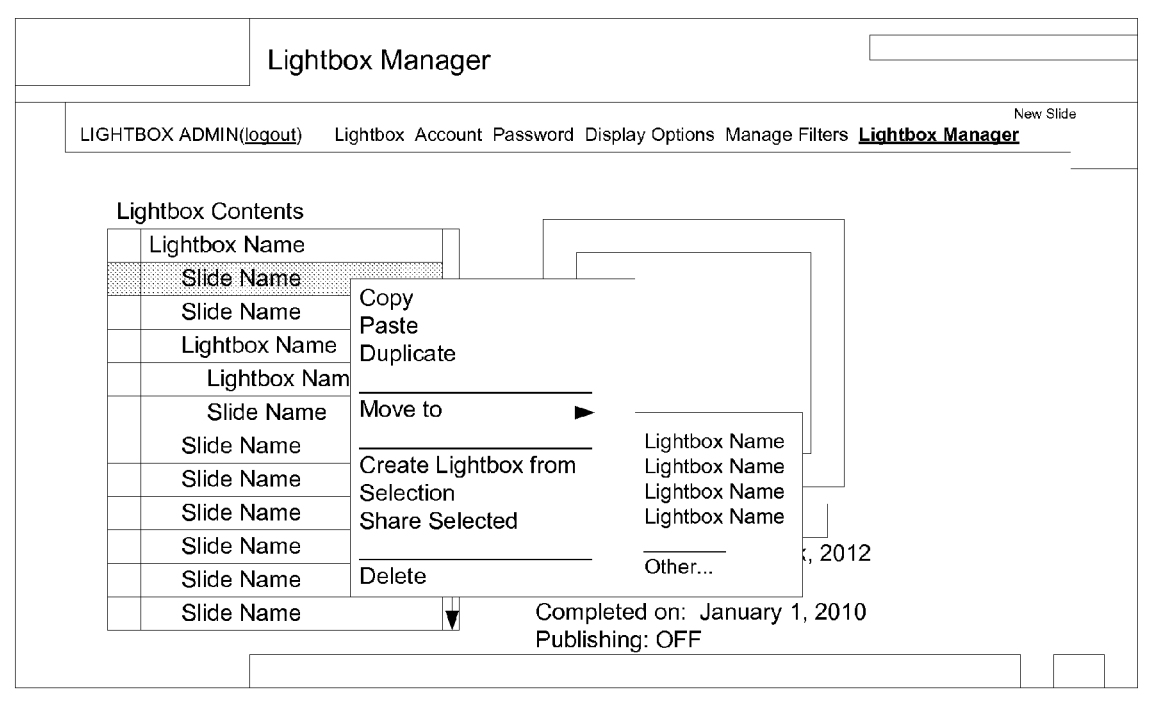

An administrator can set a default view for visitors of the site. The tags checkbox allows the administrator to turn on/off the display of content tags. FIGS. 8 and 9 show example screens regarding filter settings and categories. FIGS. 10, 11, 12, and 13 show various example screens regarding the lightbox setup and use.

FIGS. 14 to 33 show example embodiments of the present invention, including alternate views and addition of information.

In embodiments of the present invention, for a container model, the following can occur, including: checking to see if a published container belongs to an account based on container_id and account_id; gets a specific slide and insures it is not deleted; creates a new container and configures it; updates container; adds tags to slide if it is a root container (e.g., a template) and updates the slides that use this container; and deletes the container after the update. In embodiments of the present invention, for a container contents model, the following can occur, including: gets an active container, i.e., one where "is deleted=false;" gets only slides that are published and the container is published; gets the published contents from container and the account id. Then it affirms that neither container nor account id is not deleted and is published; and gets the default active container. In embodiments of the present invention, for a project model, the following can occur, including: checks authentication, loading a lot of information such as helper files, models (e.g., templates), libraries etc.; allow access to non-Java users; checks the colors, the crop positions of the slides; adds tags by account id; conduct resizing and adding of color. In embodiments of the present invention, for a slide, the following can occur, including: determines slide type, upload images, strip tags based on certain criteria, and perhaps uploading after criteria is met. For a slide model embodiment, all slides are selected for a particular account, a new slide is created, an active slide is updated, slide tags are added to the active slide, tags are split into an array, tags are stored in a tag table, tags are removed from the tag-slide and table.

In FIGS. 34 to 37, example tag model embodiments are shown. For example, to get the slides containing a search term for an account, with the terms and accountID input as parameters:

Where there are tables identifying accounts, parent containers, sub containers, slides, and container contents:
    SELECT tag information, slide information, and container information
    FROM the container contents table
    LEFT JOIN the container table by container ID
    LEFT JOIN the slide table by slide ID
    INNER JOIN the parent container by container ID
    and INNER JOIN the account table by account ID
    WHERE the identified containers, slides and accounts are each not deleted (can also limit the search to only published containers, slides and accounts)
    AND the search term exists in one of the slide tags or slide name field for the identified record, or in one of the container tags or container name fields for an identified container or the parent container.
    RETURN an array including the tag information, slide information, and container information for the identified records organized by slide name and container name.
    And, in an embodiment, to add a tag to a slide or container with the slideID or containerID, the accountID and the terms to be added as tags are input as parameters:
    Where there are tables identifying accounts, containers, slides, and tags:
    For every term to be added to the slide or container, clean up the term, for example by removing whitespace and making formatting consistent. Then check to determine if the term is already a valid tag in the tag table.
    If the tag is not already in the tag table, then create a new tag, such that a new tagID is assigned to the new term. And identify the newly assigned tad ID.
    If the tag is already in the tag table, then identify the tagID for found tag.
    Once a tagID has been created or identified, if the tag does not already exists for the slide or container, add the tag ID to the slide or container.
    If the slide or container already has the tag, no further action is required for that term. Return a message identifying the status of the update.

Embodiments of the invention may also be used to manage Internet advertising campaigns. An advertisement campaign management system may contain the tools, memory, and bandwidth to enable marketers and other advertising personnel without any computer programming skills to quickly create, store, and launch internet based marketing campaigns while retains total control of the content included in the marketing campaign at all times.

A marketer may create an advertising campaign through a graphical user interface. The graphical user interface may provide an option enabling the marketer to directly include content, such as text, images, videos, in the advertising campaign. The graphical user interface may also provide the marketer with an option to include external data from other sources on the Internet in the advertising campaign. For example, the interface may provide an option to include certain tweets from a Twitter feed, a video posted on video sharing site such as YouTube, data from a Facebook page, a certain map view from a map site such as MapQuest, and so on. When the marketer selects external data to be included in the advertising campaign, a placeholder, such as a frame, may be included in the advertising campaign with a link to the external data source. At runtime, the data from the external data source may be retrieved and inserted in the placeholder. The data may be retrieved from either the external data source itself or a periodically updated cache of data obtained from the external data source that may be stored in the advertising campaign management system.

Figure 38:
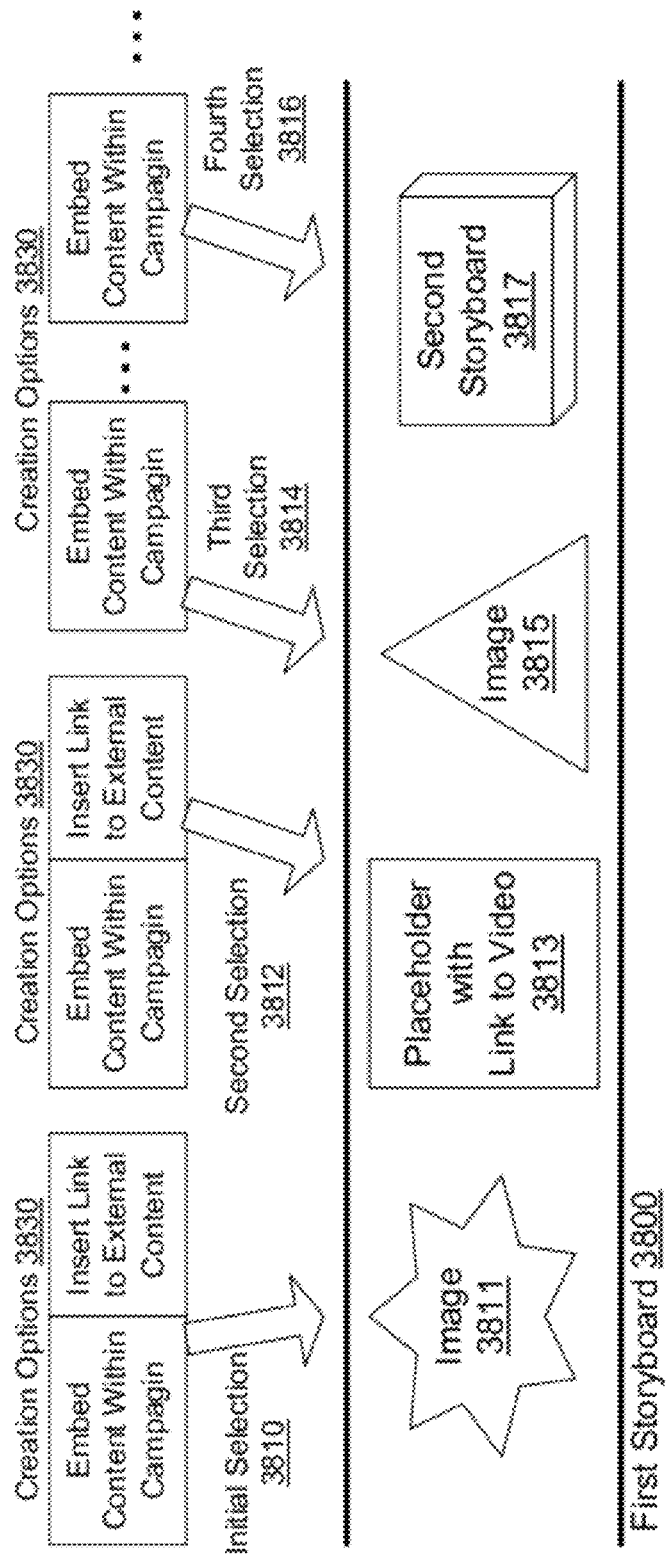
FIG. 38 shows an example embodiment of the present invention.

FIG. 38 shows an exemplary process for creating an advertising campaign. The advertising campaign may be contained within a first storyboard 3800. When the process is first started to create a new campaign, the user may be presented with one of two creation options 3830. These options may include an option to embed content within the campaign or an option to insert a placeholder and link to external content. In this example, the user initially selects 3810 the option to embed content within the campaign through a graphical user interface presenting the creation options 3830.

After making the initial selection 3810 to embed content within the campaign, the user may be presented with various options of different types of content to be embedded. For example, the user may be presented with the option to embed a image, text, video, or other types of data or files. In this example, the user may select to embed image 3811. Embedded images, text, and other objects may have any shape and need not be limited to rectangular shapes. As shown in FIG. 38, image 3811 has a seven-point star configuration that is non-rectangular.

Once the content is selected for inclusion in the advertising campaign, the content itself or a representation of the content may be included the first storyboard 3800. The first storyboard 3800 may include a linear sequence of embedded and/or linked content that may be inserted into the storyboard 3800 by selecting a corresponding creation option 3830.

In the example shown in FIG. 38, after the user has embedded image 3811 in the first storyboard 3800 of the advertising campaign, the user may make a second selection 3812 of the creation options 3830 to insert additional content in the advertising campaign. In this example, the user may select to insert a link to external content. In this case, the user may be presented with different options of external content that may be included in the advertising campaign from which the user may make a selection. For example, the user may be presented with the option to insert a user-selected Twitter feed from Twitter, a video clip from a video sharing service such as YouTube, location information from a map provider such as MapQuest or Google Maps, or other data from other services such as Facebook page updates from Facebook, company page updates from LinkedIn, and so on. Once the user selects the external data to be inserted in the advertising campaign, a placeholder may be inserted in a next unused position of the first storyboard 3800 of the advertising campaign. The placeholder may include a link to the user selected external data source. At run time, the linked data may be retrieved from either the external data source or a cache of the external data source and inserted in the placeholder. The data may also be synchronously or asynchronously updated at runtime while the advertising campaign is be executed.

In the example shown in FIG. 38, the user's second selection 3812 may be to insert a video clip of a product in the advertising campaign that is hosted on a third party server, such as YouTube. Accordingly, a placeholder with a link to the video clip 3813 may be inserted next to embedded image 3811 in the first storyboard 3800 of the advertising campaign.

Thereafter, the user may make a third selection 3814 to insert additional embedded content in the advertising campaign. In this example, the user chooses to insert a second image 3815 in the shape of a triangle. This second image 3815 is then inserted in the first storyboard 3800 next to the previously inserted placeholder for the external video clip 3813.

Finally, the user may make a fourth selection 3816 to insert additional embedded content in the advertising campaign. In this example, the user may choose to embed a second storyboard 3817. Each storyboard in the advertising campaign may have a linear format similar to that shown for the first storyboard 3800 in that the storyboard may include content or placeholders for content that are aligned sequentially.

The first piece of content included in the second storyboard 3817 may be shown in the first storyboard 3800 as a visual representation of the second storyboard 3817 in the first storyboard 3800. For example, if the first piece of content in the second storyboard 3817 is an embedded image of a particular product, then that embedded image of the product may appear in the first storyboard 3800 next to the image 3815.

If a user were to select or otherwise activate the embedded image of the particular product shown in the first storyboard 3800, then the second storyboard 3817 may be activated and the contents of the second storyboard 3817 may replace and be shown instead of the content of the first storyboard 3800.

Once the content of the advertising campaign has been finalized, the advertising campaign management system may store the advertising campaign and automatically generate code providing a link to the advertising campaign as stored in the advertising campaign management system. This code may then be distributed and included in various webpages and/or websites in order to present the advertising campaign on each of the webpages and/or websites.

Figure 39:
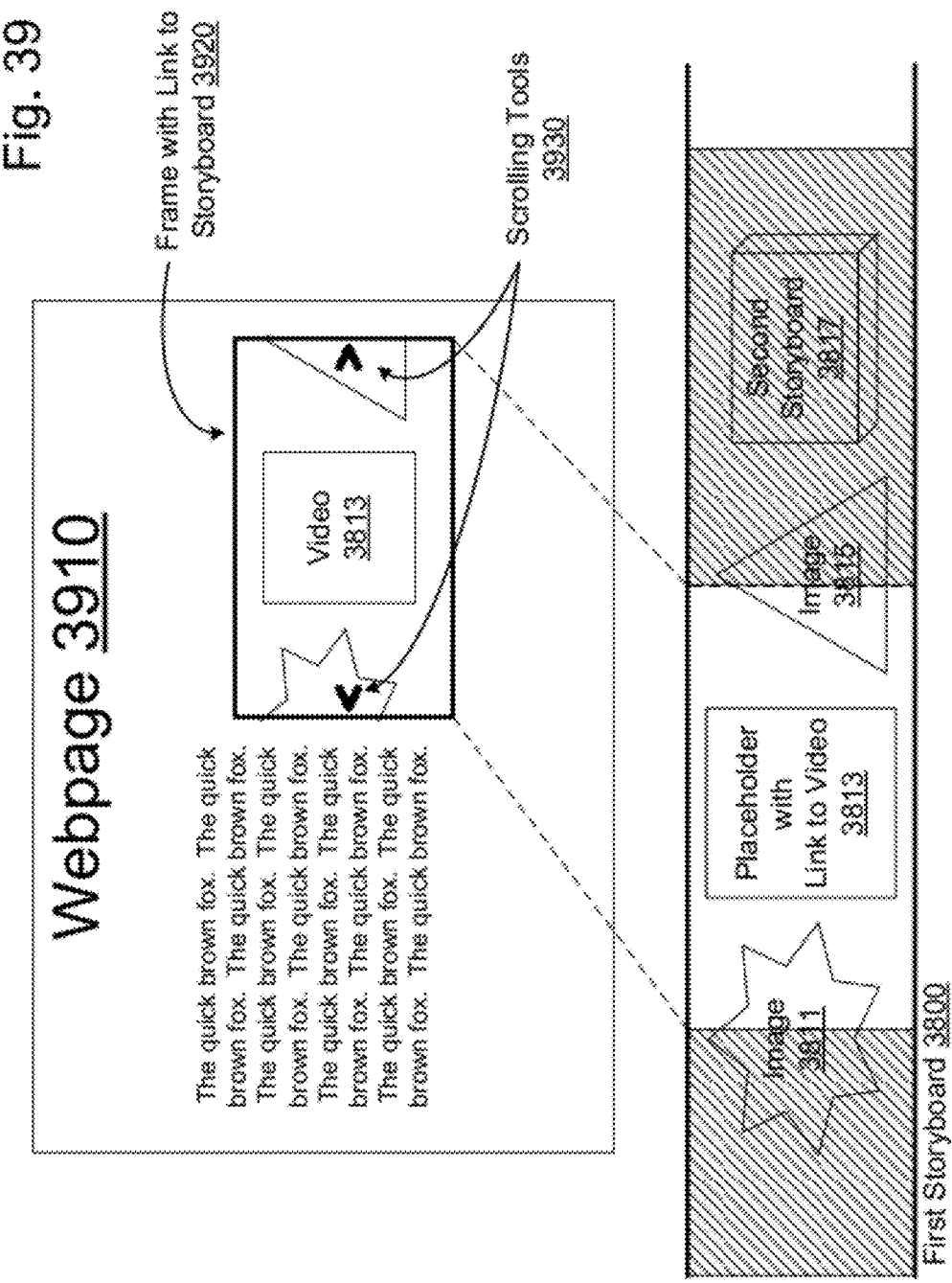
FIG. 39 shows an example embodiment of the present invention.

FIG. 39 shows an exemplary webpage 3910 that includes the code providing a link to the advertising campaign. In this example, the code is inserted in the webpage 3910 so that each time the webpage page is loaded, a copy of the advertising campaign obtained from the advertising campaign management system is also loaded into a frame 3920 through a link to the advertising campaign. The link 3920 may identify specific content in the advertising campaign that is to be initially shown in each frame 3920.

For example, in the case of webpage 3910, the link to the advertising campaign may specify that the content associated with video 3813 is to be initially presented to the user in the frame 3920 when the web page is first loaded. In other webpages, the content that is initially displayed in the frame may vary. Each frame may also include scrolling tools 3930 that enable the user to scroll along the sequential path of the storyboard shown in the frame 3920. Thus, in the example shown in FIG. 39, activating the right scrolling tool may cause the storyboard to scroll right to bring more of image 3815 into view in the frame 3920 while cause video 3813 to exit the frame 3920 on the left. The scrolling tools 3930 may enable a user to view any and all sections of the advertising campaign. The user may view the full contents of the second storyboard 3817 by scrolling until the initial view of the second storyboard 3817 appears within the frame 3920. At that point the user may click on or otherwise activate the second storyboard 3817. When the second storyboard 3817 has been activated, the contents of the second storyboard 3817 may replace the contents of the first storyboard 3800 as shown in FIG. 39 so that only the contents of the second storyboard 3817 appear in the frame.

Because each website and webpage displaying the advertising campaign only includes a link to advertising and retrieves the advertising campaign each time the website or webpage is loaded, the advertising campaign may be changed, if necessary, in real time once without having to worry about inconsistent prior versions remaining in circulation after the changes have been made.

Additionally, by enabling viewers of the advertising campaign in websites and webpages to navigate through the entire advertising campaign while defaulting to different initial content views in different websites and webpages, it is possible to use the same advertising campaign in different advertising contexts, while providing viewers of the advertising campaign in each instance with a more sophisticated interface to quickly obtain more detailed marketing information.

For example, some companies have a multi-tiered Internet marketing strategy that includes posting advertisements on different websites, using Twitter account to Tweet marketing information, maintaining a YouTube marketing channel with product videos, and so on. The advertisement campaigns discussed herein may be used to consolidate of these marketing activities that would otherwise have to be managed manually and individually. For example, instead of generating and deploying separate advertisements to be displayed on different websites, the link to the advertising campaign may be deployed instead. The link may include a specific identifier of particular content in the advertising campaign that is to be initially displayed in the advertising frame, so that different advertisements in different websites may show by default different content in the advertising campaign. Once the advertising campaign is displayed in the frame, however, the user may also navigate to other content in the campaign.

The YouTube marketing channel may include a link to the advertising campaign that defaults to show linked YouTube content included in the advertising campaign when the marketing channel is loaded. Thus, links to the advertising campaign may be used in different contexts on different websites and webpages. In each instance, the entire content of the advertisement campaign is accessible to the user while also being centrally controlled and managed at the advertising campaign management system.

Figure 40:
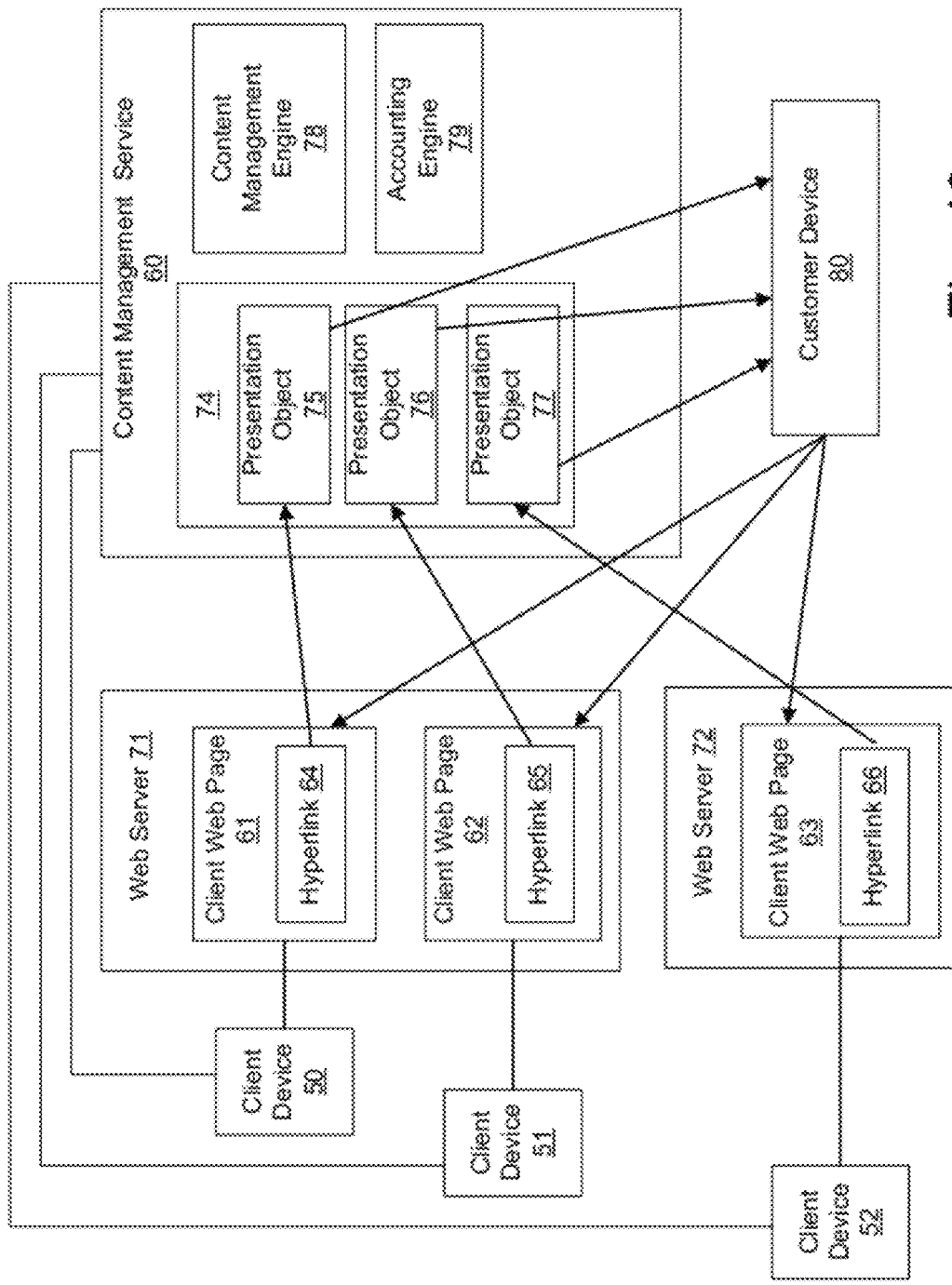
FIG. 40 shows an example embodiment of the present invention.

FIG. 40 shows a block diagram of a system according to an example embodiment of the present invention. The system may include at least one client device 50, 51 and 52, at least one web server 71 and 72, a content management service 60 and at least one customer device 80.

The client devices 50-52 and the customer device 80 may be computing devices with Web access capability. For example, the client device 50 may be a desktop computer, the client device 51 may be a laptop, the client device 52 may be a tablet, and customer device 80 may be a smartphone.

Content management service 60 provides for the creation, storage and management of presentations and may include a presentation database 74, a content management engine 78 and an accounting engine 79. The various components of the content management service 60 may, but need not be centrally located in a single location. For example, presentation database 74 may be located on its own dedicated Web server.

Web server 71 may include at least one web page 61 and 62, managed by and including content relating to a user of a client device. Web server 72 may also include at least one web page 63, managed by and including content relating to a user of a client device. Each Web page may include advertising information pertaining to a product or service offered by the client user. In an example embodiment this advertising information includes at least one presentation object comprising a presentation that includes a set of slides and/or lightboxes. The slides/lightboxes may be organized in a non-linear fashion, as previously described.

Figure 41:
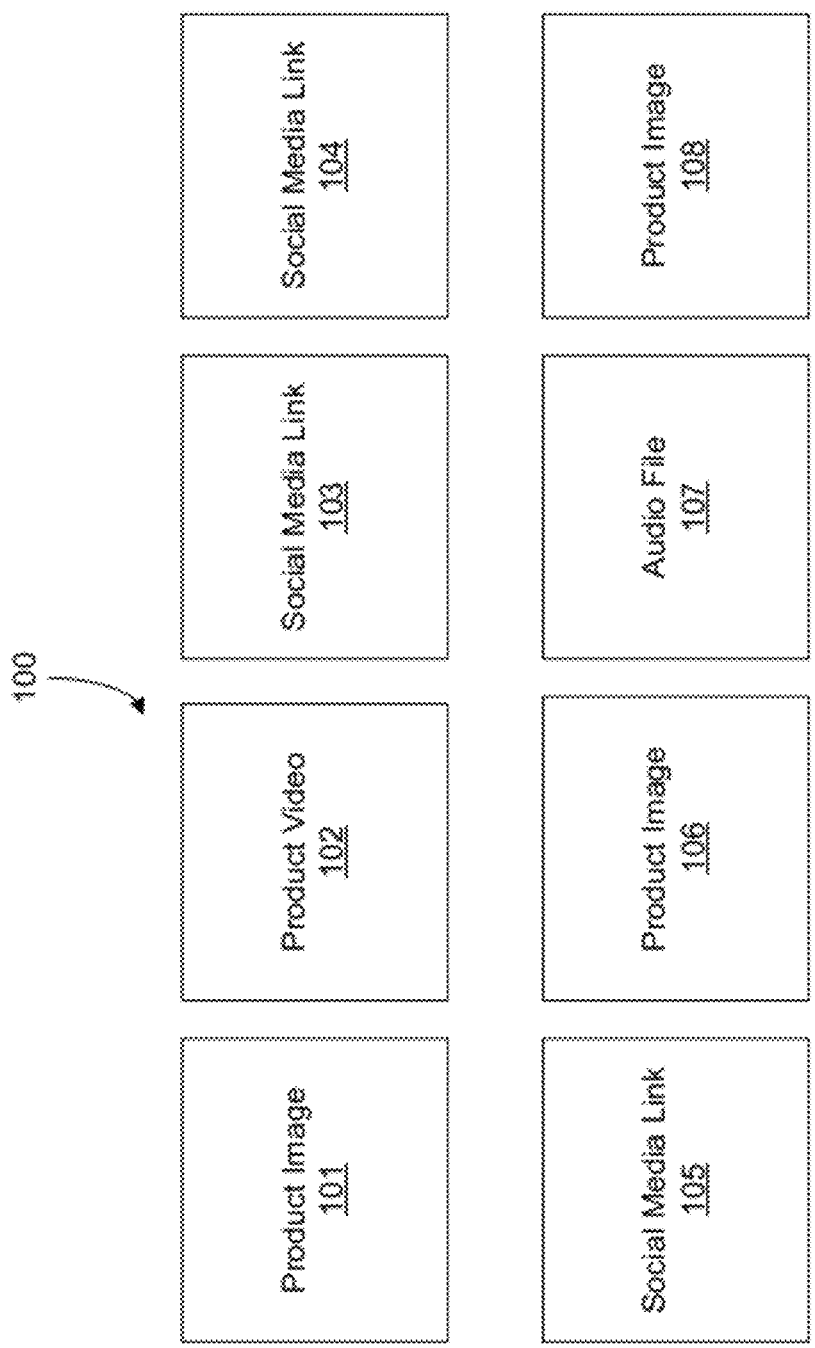
FIG. 41 shows an example embodiment of the present invention.

FIG. 41 shows a grid view of a presentation 100 according to an example embodiment of the present invention. The presentation 100 may include any of the content described above in connection with the slides and lightboxes. For example, presentation 100 may include product images 101, 106 and 108, a product video 102, social media links 103, 104 and 105, and an audio file 107. Each of the slides/lightboxes may relate to a single product/service or a group of related products/services offered by the client user. In the case of a lightbox, there may be a sub-set of slides/lightboxes that can be accessed. Thus, presentation 100 may comprise a non-linear, interactive and electronic brochure. As explained below, presentations may be embedded into Web pages and made viewable to potential customers on the Web, e.g., a user of customer device 80.

Returning to FIG. 40, each Web page may include a hyperlink to a presentation object stored in the presentation database 74. For example, hyperlink 64 points to presentation object 75, hyperlink 65 points to presentation object 76, and hyperlink 66 points to presentation object 77. The arrows in FIG. 38 represent the flow of traffic when the customer device 80 requests a client Web page. Each Web page may be partially loaded on the customer device 80 based on content stored on the Web server, e.g., images, audio files, videos, and other files stored on the Web server and associated with the Web page. The hyperlink contained on the page directs the customer device 80 to a corresponding presentation object, completing the loading and allowing display of the entire Web page. Thus, the presentation objects may appear as embedded objects within Web pages.

In an example embodiment, the presentations may be displayed within a banner advertisement portion of the Web page. The banner may show at least one static image. For example, the static image may be the first slide in a presentation or a thumbnail image of a slide/lightbox. On click of the static image, the complete presentation may then be displayed. In one embodiment, the presentation may be expanded within the display area allocated to the banner. In another embodiment, the presentation may be displayed in another portion of the Web page, or in a separate page, e.g., as a pop-up.

Content management engine 78 may provide software tools enabling the client users to create, edit and manage presentation objects. The tools may be accessed via the Web from the client devices 50-52. In an example embodiment, the client users may: create a presentation; publish the presentation; publish one or more slides/lightboxes in the presentation; provide public access to the presentation by placing a hyperlink to a corresponding presentation object on at least one Web page; edit the presentation; un-publish one or more slides/lightboxes in the presentation, enable/disable public users to place hyperlinks to the presentation object on other Web pages; create a copy of the presentation object and store the copy locally on the database 74 and/or a remote database; and delete the presentation object. In an example embodiment, the software tools are accessed via a Web interface, e.g., through a Web browser program.

Accounting engine 79 may store information based on which the client users are billed for access to the content management service 60. In an example embodiment, client users are billed based on a flat licensing arrangement. For example, a set of licensing fees may be determined based on the maximum number of presentation objects that can be associated with the client user's account at a given time. In an example embodiment, additional fees may be imposed for optional add-on services, including video hosting for videos contained in the presentations, and software tools that facilitate embedding of the presentation objects into third-party Web pages that are only partially managed by the client user (e.g., social media Web sites, on which the client user may have an account and a corresponding Web page, or mobile, tablet and other non-desktop oriented Web sites). The accounting engine 79 may store information that identifies which license the client has agreed to, the client's account balance, and detailed billing statements.

In an example embodiment, an optional software tool may provide a low-resolution version of a presentation as a separate presentation object, which is suitable for embedding on a mobile, tablet or other non-desktop oriented Web page. The low resolution version may be generated from a high resolution version corresponding to an original presentation object.

In an example embodiment, client users may be billed based on the amount of Web traffic directed towards their presentation objects. For example, each time a Web user clicks on or interacts with the presentation object, this may be considered a billable traffic instance.

Figure 42:
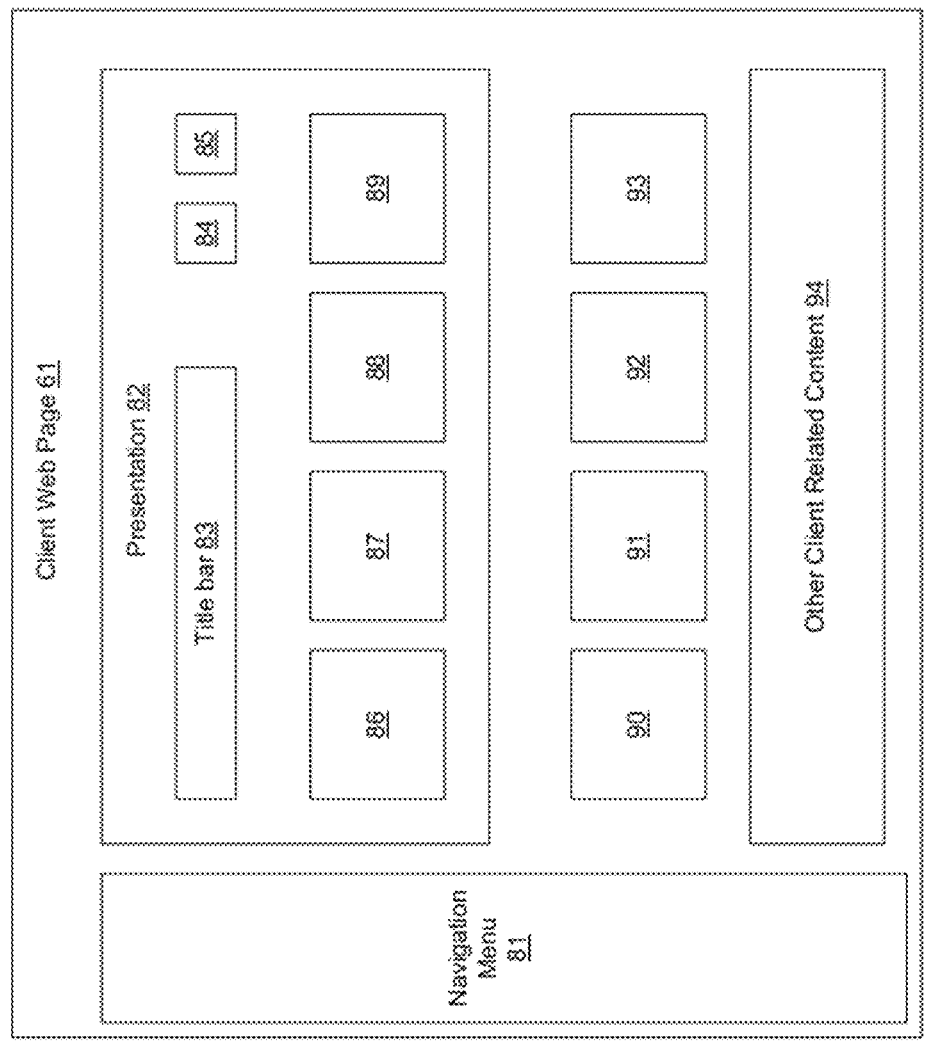
FIG. 42 shows an example embodiment of the present invention.

FIG. 42 shows a layout of the client Web page 61 according to an example embodiment of the present invention. The page 61 may include a conventional navigation menu containing links to other pages on the client's Web site and/or external Web sites. A presentation 82 corresponding to the presentation object 75 is located in an portion of the page. The presentation 82 may include a title bar 83 that identifies a currently selected slide/lightbox. A first slide/lightbox in a set of slides/lightboxes (e.g., slide/lightbox 86 from a set of slides/lightboxes including 86, 87, 88 and 89) may be displayed by default when the page 61 is first shown on the customer device. The presentation 82 may include a button 84 that on click brings up a menu through which the customer can share the presentation 82, e.g., by emailing a hyperlink to the presentation 82 or by embedding the hyperlink into another Web page managed by the customer. The presentation may include a button 85 that on click switches display to another view mode, e.g., full size view of a single slide/lightbox. The full size view may be displayed by replacing the presentation 82 with a single slide. Alternatively, the full size view may be shown in another portion of the page 61, or on another page, e.g., in a pop-up window.

The Web page 61 may include a set of links 90, 91, 92 and 93, each of which is displayed as a thumbnail image of a corresponding slide/lightbox. For example, link 90 may be a thumbnail of slide/lightbox 86, link 91 may be a thumbnail of slide/lightbox 87, link 92 may be a thumbnail of slide/lightbox 88, link 93 may be a thumbnail of slide/lightbox 89. The links 90-93 may, but need not be, arranged in the same order as the slides/lightboxes 86-89. In an example embodiment, on click of a link 90-93, the corresponding slide/lightbox may be selected and displayed, e.g., in a separate portion of the page 61. In an example embodiment, on click of a link 90-93 may cause the presentation 82 to switch to another view with the corresponding presentation being selected, e.g., full size view.

The Web page 61 may include other client related content 94, which may also relate to the same product/service that is the subject of the presentation 82, or may relate to another product/service, or any other information about the client.

Figure 43:
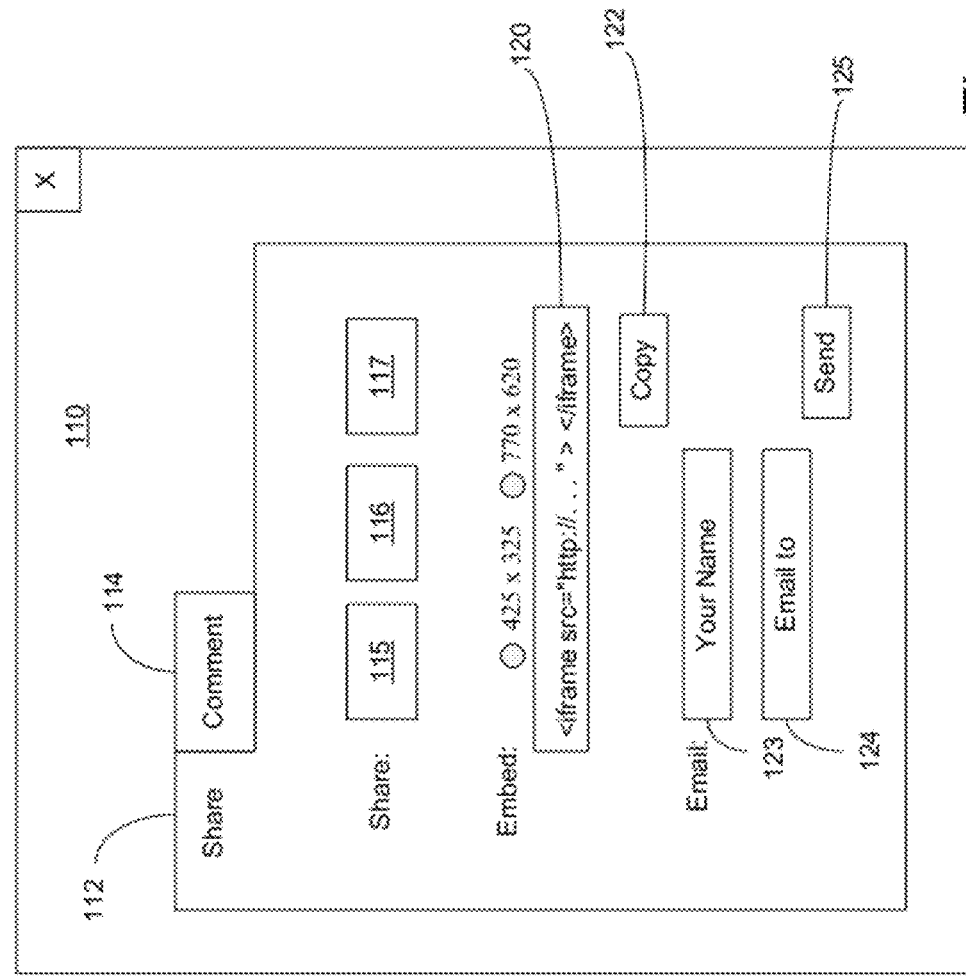
FIG. 43 shows an example embodiment of the present invention.

FIG. 43 shows a user interface 110 for sharing a presentation object according to an example embodiment of the present invention. The interface 110 may be a sub-menu within a presentation and may include a set of buttons 115, 116 and 117 for sharing the presentation. Each button 115-117 may be associated with an external Web site (e.g., a social media Web site) and on click, directs the customer device to an entry form or input menu on the external Web site. On click, the buttons 115-117 may cause input parameters for the entry form/input menu to be transmitted to the external Web site, saving the customer from having to manually fill in the parameters. In an example embodiment, an input parameter is the URL of the presentation object.

In an example embodiment, the interface 110 may display a URL for the presentation object in a field 120. The customer may copy the URL and paste it into source code for a Web page, thereby manually embedding the presentation. On click of a Copy button 122, the URL may be automatically copied onto an clipboard provided by the customer device's operating system.

In an example embodiment, the interface 110 may include a Send button 125 that, on click, causes an email message containing the URL of the presentation to be sent to one or more email addresses provided by the customer. The customer may provide the email addresses via an input field 124, along with providing the customer's name in an input field 123. An email sent in this manner may then identify the customer's name as the sender of the email.

In an example embodiment, the interface 110 may include a separate menu 114 by which the customer can input a comment regarding the presentation. The comment may be stored along with the presentation, e.g., in the database 74, and made viewable to other Web users, including the client.

Figure 44:
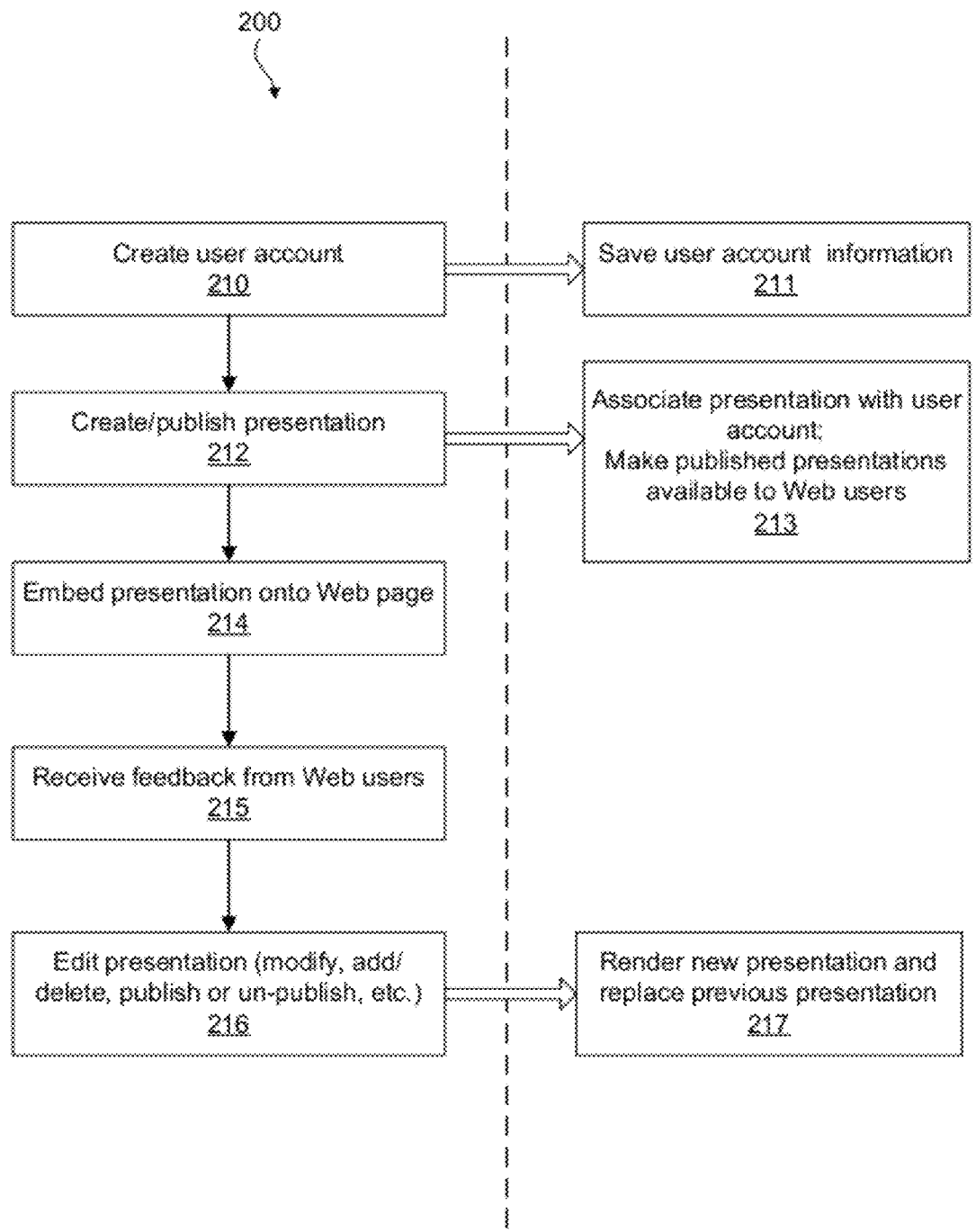
FIG. 44 shows an example embodiment of the present invention.

FIG. 44 shows a flowchart of a method 200 for creating and publishing a presentation object according to an example embodiment of the present invention. The method 200 may be performed at a client device and at the content management service 60. Blocks to the left of the dashed line correspond to actions that may be performed by the client. Blocks to the right of the dashed line correspond to actions that may be performed by the content management service 60.

At 210 the client may create a user account with the content management service 60. A username and password may be selected and associated with the user account. The client may, at the time of creating the user account, enter into a fee agreement with the service 60. For example, the fee agreement may be a flat license and the client may be provided with an option to select from a set of available licenses. Alternatively, the fee agreement may be based on the actual amount of traffic generated by the client's presentations (e.g., measured by Web user traffic). Additionally, the client may provide payment information, e.g., a bank account, a credit card number or a billing address. The username, password, fee agreement, payment information, and other user account information may then be saved by the content management service (211).

At 212, the client may create a presentation. The presentation may be saved in the database 74 and associated with the user account (213). Thus, the presentation can be made accessible to the client whenever the client is logged into the user account via the username and password.

After creating the presentation, the client may publish the presentation. By default, the entire presentation may be published. The client may choose to un-publish the entire presentation, or selectively publish individual slides/lightboxes. Based on the client's publication choices, the content management service 60 makes the presentation available for viewing by other Web users.

At 214, the client may choose to embed the presentation onto a Web page. Embedding may involve inserting, within the source code of the Web page, a hyperlink to the URL of the presentation object associated with the presentation. In an example embodiment, the hyperlink is an HTML inline frame (iframe).

At 215, the client may receive feedback from Web users regarding the presentation. Feedback may include questions or comments about the product/service that is the subject of the presentation. Feedback may also include general questions about the client or comments relating to technical issues with respect to the presentation itself (e.g., a blank slide or a broken link). In an example embodiment, Web users may provide comments by interacting with the presentation. For example, if a slide includes a link to a social media Web page, the Web users may be directed to a bulletin board on the social media page.

At 216, the client may edit the presentation in response to the user feedback. Editing may include modifying/adding/deleting content. Editing may also include publishing or un-publishing the presentation or selected portions of the presentation, e.g., individual slides.

At 217, the content management service 60 renders a new presentation in accordance with the edits from the client. The new presentation may replace the previous presentation. Alternatively, the client may choose to save the new presentation as a separate presentation object, thereby preserving the original presentation. The new presentation is then made available to Web users in accordance with the client's publication choices as to the new presentation.

Figure 45:
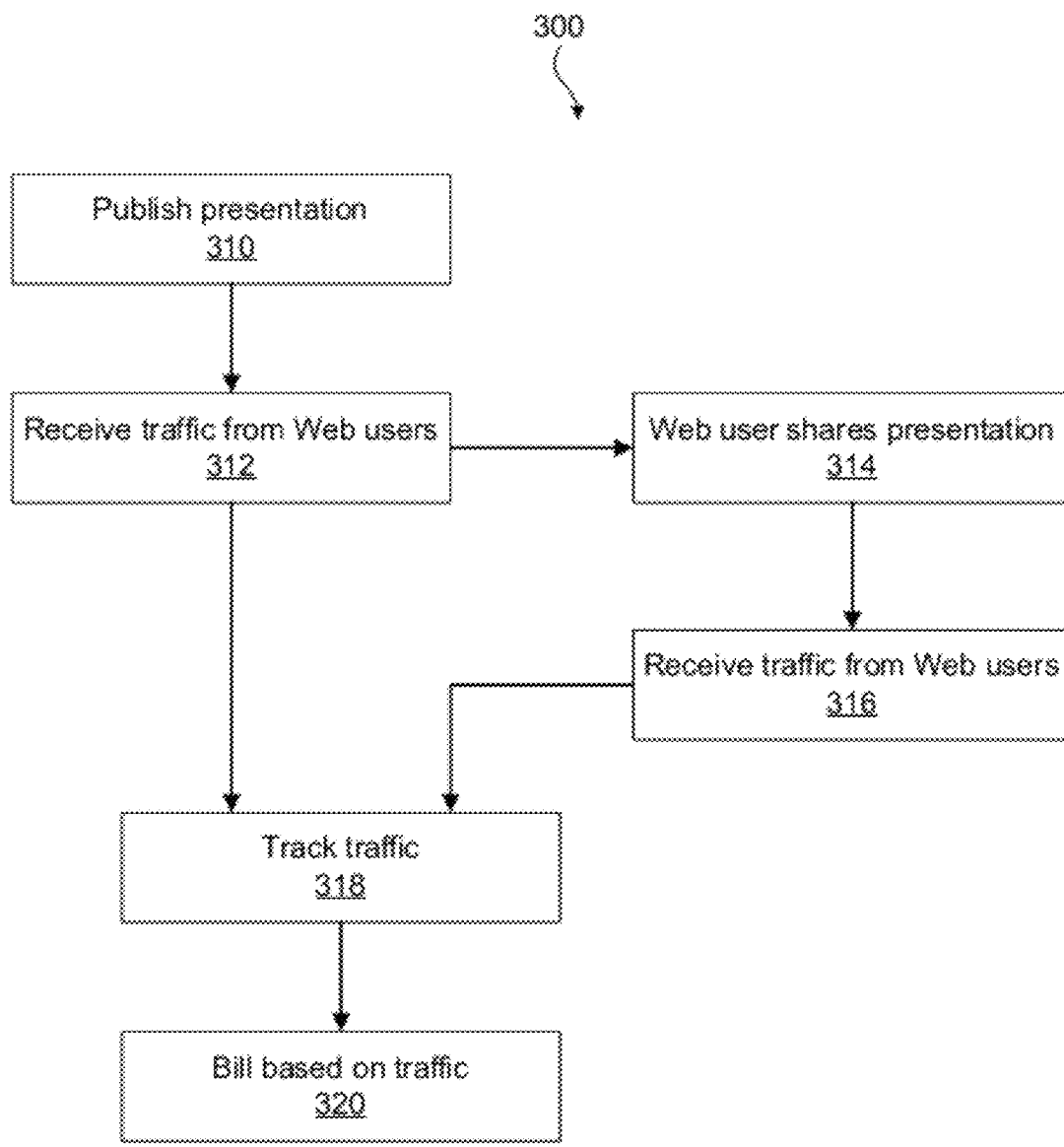
FIG. 45 shows an example embodiment of the present invention.

FIG. 45 shows a flowchart of a method 300 for generating revenue from the creating and publishing of a presentation object according to an example embodiment of the present invention.

At 310, the client may publish a presentation, e.g., in its entirety or selected portions. The content management service 60 makes the published presentation available to Web users.

At 312, a Web page on which the presentation is embedded may receive traffic from Web users. If a Web user interacts with the presentation, the traffic is tracked (318), e.g., by updating a counter storing the total number of interactions in a given billing cycle.

At 314, a Web user may decide to share the presentation with other Web users, e.g., by emailing a hyperlink to the presentation or embedding the presentation on another Web page.

At 316, the shared presentation may generate additional Web traffic from other Web users. The additional Web traffic is also tracked at 318.

At 320, the content management service 60 may bill the client based on the traffic, e.g., based on the total amount of traffic directed towards a given presentation object or the sum of the total traffic directed towards each of a plurality of presentation objects managed by the client.

The various computer systems described herein may each include a storage component for storing machine-readable instructions for performing the various processes as described and illustrated. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (or computer readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described or other storage mechanisms.

Although the present invention has been described with reference to particular examples and embodiments, it is understood that the present invention is not limited to those examples and embodiments. The present invention includes variations from the specific examples and embodiments described herein. Except to the extent necessary or inherent in the processes themselves, no particular order to steps or stages of methods or processes described in this disclosure, including the figures is implied. In many cases, the order of process steps may be varied without changing the purpose, effect or import of the methods described.

The invention claimed is:

1. A system, comprising:
a content management service including a database that stores a presentation object, the presentation object including a plurality of electronic presentation slides, each slide including material comprising at least one of an image, a video, a link to a social media webpage, and an audio file; and
a Web server having stored thereon a Web page including a first link to the presentation object, wherein:
the presentation object appears as an embedded presentation that is loaded from the database based on the first link when the Web page is to be displayed on a computing device that accesses the Web page via the Web;
the presentation object includes a plurality of slide sequences, including a first slide sequence and a second slide sequence that is non-linear relative to the first slide sequence;
the first slide sequence includes a slide that provides direct access to the second slide sequence;
the second slide sequence includes a slide that provides direct access to the first slide sequence;
the content management service generates a graphical user interface, wherein the graphical user interface includes movable graphical representations of data objects, each data object assigned to and representing an entire slide sequence; and
the content management service:
receives a selection of one of the first slide sequence and the second slide sequence through activation of a respective graphical representation;
modifies a relationship of the selected slide sequence in response to one of:
moving, without selecting individual slides of the selected slide sequence, the activated graphical representation so that the selected slide sequence becomes non-linear relative to a different slide sequence than one with which the selected slide sequence is currently non-linear; and
moving, without selecting individual slides of the selected slide sequence, the activated graphical representation so that the selected slide sequence becomes accessible from a different slide of the slide sequence with which the selected slide sequence is currently non-linear; and
updates the presentation object in the database to reflect the modified relationship.

2. The system of claim 1, wherein the content management service includes a content management engine that provides software tools to create, edit and manage presentation objects stored in the database, the software tools outputting the graphical user interface for display at a computing device of an authorized user.

3. The system of claim 1, wherein the content management service is configured to receive a publication preference, and make the presentation object publicly available over the Web in accordance with the publication preference.

4. The system of claim 3, wherein the content management service includes an accounting engine that stores billing information and wherein the content management service updates the billing information based on access to the content management service to output a bill for a creator of the presentation object.

5. The system of claim 4, wherein the information pertains to a license agreement whereby the creator is charged a specified amount for the ability to create, store and manage presentation objects in the database.

6. The system of claim 4, wherein the billing information includes a measure of an amount of Web traffic directed towards the presentation object, and the creator is billed based on the amount of Web traffic.

7. The system of claim 1, wherein:
the first link identifies the preselected slide;
the Web server stores a second Web page that includes a second link to the same presentation object; and
the second link identifies a different preselected slide of the presentation object, which slide is presented when the second Web page is initially displayed.

8. The system of claim 1, wherein the graphical user interface allows the relationship of the selected slide sequence to be modified by:
dragging the activated graphical representation; and
dropping the activated graphical representation into a user specified position in relation to another slide or slide sequence.

9. The system of claim 1, wherein the graphical user interface:
includes an option to perform, by the content management service, a search that displays all slides in any presentation object stored in the database, which slides match at least one user inputted identifier; and
includes an option to, after results of the search are displayed, revert to a displayed state of the slides as existed immediately prior to the displaying of the search results.

10. The system of claim 9, wherein the option to revert is a breadcrumb mechanism.

11. A method, comprising:
at a first computing device, providing access to a database that stores a presentation object including a plurality of electronic presentation slides, each slide including material comprising at least one of an image, a video, a link to a social media webpage, and an audio file, wherein:
the presentation object includes a plurality of slide sequences, including a first slide sequence and a second slide sequence that is non-linear relative to the first slide sequence;
the first slide sequence includes a slide that provides direct access to the second slide sequence; and
the second slide sequence includes a slide that provides direct access to the first slide sequence;
at the first computing device, receiving a request for the presentation object, wherein the request is transmitted from a second computing device based on a first link contained in a Web page, the request transmitted in advance of an initial displaying of the Web page;
providing the presentation object to the second computing device, wherein the presentation object appears as an embedded presentation when the Web page is displayed on the second computing device;
generating, by the first computing device, a graphical user interface for display at the second computing device, wherein the graphical user interface includes movable graphical representations of data objects, each data object assigned to and representing an entire slide sequence; and
at the first computing device:
receiving a selection of one of the first slide sequence and the second slide sequence through activation of a respective graphical representation; and
modifying a relationship of the selected slide sequence in response to one of:
moving, without selecting individual slides of the selected slide sequence, the activated graphical representation so that the selected slide sequence becomes non-linear relative to a different slide sequence than one with which the selected slide sequence is currently non-linear; and
moving, without selecting individual slides of the selected slide sequence, the activated graphical representation so that the selected slide sequence becomes accessible from a different slide of the slide sequence with which the selected slide sequence is currently non-linear; and
updating the presentation object in the database to reflect the modified relationship.

12. The method of claim 11, further comprising:
at the first computer, providing a software tool to create, edit and manage presentation objects stored in the database, the software tool outputting the graphical user interface for display at the second computing device.

13. The method of claim 11, further comprising:
at the first computing device, receiving a publication preference from the second computing device, and making the presentation object publicly available over the Web in accordance with the publication preference.

14. The method of claim 13, further comprising:
billing a creator of the presentation object for access to the software tool and the database.

15. The method of claim 14, wherein the creator is billed based on a license agreement whereby the creator is charged a specified amount for the ability to create, store and manage presentation objects in the database.

16. The method of claim 14, wherein the creator is billed based on an amount of Web traffic directed towards the presentation object.

17. The method of claim 11, further comprising:
receiving a request for the presentation object, wherein the request is transmitted based on a second link contained in a second Web page; and
presenting a different preselected slide of the presentation object when the second Web page is initially displayed;
wherein the first link and the second link respectively identify the preselected slides displayed on the Web page and the second Web page.

18. The method of claim 11, wherein the graphical user interface allows the relationship of the selected slide sequence to be modified by:
dragging the activated graphical representation; and
dropping the activated graphical representation into a user specified position in relation to another slide or slide sequence.

19. The method of claim 11, wherein the graphical user interface:
- includes an option to perform, by the content management service, a search that displays all slides in any presentation object stored in the database, which slides match at least one user inputted identifier; and
- includes an option to, after results of the search are displayed, revert to a displayed state of the slides as existed immediately prior to the displaying of the search results.

20. The method of claim 19, wherein the option to revert is a breadcrumb mechanism.

* * * * *